United States Patent
Lee et al.

(10) Patent No.: US 12,457,283 B2
(45) Date of Patent: Oct. 28, 2025

(54) ELECTRONIC DEVICE COMPRISING SIDE KEY

(71) Applicant: Samsung Electronics Co., Ltd., Suwon-si (KR)

(72) Inventors: Kyoungsun Lee, Suwon-si (KR); Kwanghwan Kim, Suwon-si (KR); Yuchul Chang, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 326 days.

(21) Appl. No.: 18/122,994

(22) Filed: Mar. 17, 2023

(65) Prior Publication Data

US 2023/0247126 A1 Aug. 3, 2023

Related U.S. Application Data

(63) Continuation of application No. PCT/KR2021/014252, filed on Oct. 14, 2021.

(30) Foreign Application Priority Data

Oct. 16, 2020 (KR) .................. 10-2020-0134160

(51) Int. Cl.
*H04M 1/23* (2006.01)
*G06F 1/16* (2006.01)
*H04M 1/02* (2006.01)

(52) U.S. Cl.
CPC .......... *H04M 1/236* (2013.01); *G06F 1/1671* (2013.01); *H04M 1/0249* (2013.01); *H04M 1/0277* (2013.01)

(58) Field of Classification Search
CPC ............. H10H 13/705; H01H 2233/03; H01H 2231/022; G06F 1/1671; H04M 1/236; H04M 1/0249; H04M 1/0277
See application file for complete search history.

(56) References Cited

U.S. PATENT DOCUMENTS

| | | | |
|---|---|---|---|
| 8,284,568 B2 | 10/2012 | Xiao | |
| 8,542,482 B2 * | 9/2013 | Hsiung | ............... H01H 13/705 200/341 |

(Continued)

FOREIGN PATENT DOCUMENTS

| | | |
|---|---|---|
| CN | 106847588 A | 6/2017 |
| JP | 2020077473 A | 5/2020 |

(Continued)

OTHER PUBLICATIONS

International Search Report with Written Opinion issued in International Application No. PCT/KR2021/014252; International Filing Date Oct. 14, 2021; Date of Mailing Feb. 9, 2022 (13 pages).

(Continued)

*Primary Examiner* — Patrick F Marinelli
(74) *Attorney, Agent, or Firm* — CANTOR COLBURN LLP

(57) ABSTRACT

An electronic device according to an embodiment includes a housing having a key-hole formed therein, a key coupled to the housing so as to be at least partially disposed in the key-hole, a key circuit board that is disposed inside the housing and that includes a switch, the switch being disposed on one surface of the key circuit board and pressed by the key, a key bracket that supports the key circuit board such that at least a portion of the key circuit board faces the key, a support structure formed in the housing to support the key bracket and a fixing structure that fixes the key bracket to the housing. The fixing structure includes a first locking protrusion disposed in one of the housing and the key bracket and one of a locking hole and a locking jaw disposed in the other one of the housing and the key bracket so as to be fastened with the first locking protrusion.

20 Claims, 23 Drawing Sheets

(56) References Cited

U.S. PATENT DOCUMENTS

| | | | |
|---|---|---|---|
| 9,426,267 B2 | 8/2016 | Choi et al. | |
| 9,529,391 B2 | 12/2016 | Ely | |
| 9,578,759 B2 | 2/2017 | Seo et al. | |
| 9,870,880 B2 | 1/2018 | Zercoe et al. | |
| 10,051,096 B2 | 8/2018 | Baek et al. | |
| 10,078,350 B2 | 9/2018 | Ely | |
| 10,128,061 B2 | 11/2018 | Zercoe et al. | |
| 10,134,539 B2 | 11/2018 | Leong et al. | |
| 10,192,696 B2 | 1/2019 | Zercoe et al. | |
| 10,285,285 B2 * | 5/2019 | Song | H01H 13/84 |
| 10,491,728 B2 * | 11/2019 | Jo | H04M 1/0254 |
| 10,665,924 B2 | 5/2020 | Son et al. | |
| 10,768,664 B2 * | 9/2020 | Cho | G06F 1/1684 |
| 10,839,194 B2 * | 11/2020 | Jung | G06V 40/1329 |
| 10,879,019 B2 | 12/2020 | Zercoe et al. | |
| 11,036,255 B2 * | 6/2021 | Cho | G06F 1/1637 |
| 11,169,619 B2 | 11/2021 | Kim et al. | |
| 11,324,135 B2 * | 5/2022 | Kim | H05K 5/069 |
| 11,561,577 B2 * | 1/2023 | Cho | G06F 1/1643 |
| 11,612,066 B2 * | 3/2023 | Im | H05K 5/10 |
| 11,837,416 B2 * | 12/2023 | Moon | G06F 1/1671 |
| 11,972,911 B2 * | 4/2024 | Choi | H01H 13/14 |
| 12,093,359 B2 * | 9/2024 | Koch | G06F 21/32 |
| 2011/0228494 A1 * | 9/2011 | Xiao | H01H 13/705 |
| | | | 361/752 |
| 2012/0050962 A1 * | 3/2012 | Hsiung | H04M 1/236 |
| | | | 361/679.01 |
| 2014/0168867 A1 * | 6/2014 | Choi | H04M 1/236 |
| | | | 361/679.01 |
| 2015/0092345 A1 | 4/2015 | Ely | |
| 2016/0189891 A1 | 6/2016 | Zercoe et al. | |
| 2016/0379767 A1 | 12/2016 | Ely | |
| 2017/0118319 A1 * | 4/2017 | Jun | H04B 1/3833 |
| 2017/0245376 A1 * | 8/2017 | Song | H01H 13/84 |
| 2018/0183912 A1 * | 6/2018 | Lim | G06F 1/1652 |
| 2018/0358190 A1 * | 12/2018 | Lee | H04M 1/23 |
| 2019/0080860 A1 * | 3/2019 | Choi | H04M 1/236 |
| 2019/0289108 A1 * | 9/2019 | Jo | H04M 1/18 |
| 2019/0317553 A1 * | 10/2019 | Cho | G06F 1/1626 |
| 2020/0265212 A1 * | 8/2020 | Jung | H04B 1/3888 |
| 2020/0267863 A1 * | 8/2020 | Kim | H04M 1/026 |
| 2021/0117012 A1 | 4/2021 | Kim et al. | |
| 2021/0241984 A1 * | 8/2021 | Moon | G06F 1/1671 |
| 2021/0303028 A1 | 9/2021 | Cho et al. | |
| 2022/0013310 A1 * | 1/2022 | Choi | H01H 13/14 |
| 2023/0247126 A1 * | 8/2023 | Lee | G06F 1/1671 |
| | | | 455/575.1 |

FOREIGN PATENT DOCUMENTS

| | | |
|---|---|---|
| KR | 20130053940 A | 5/2013 |
| KR | 20130090594 A | 8/2013 |
| KR | 20130096077 A | 8/2013 |
| KR | 20130096349 A | 8/2013 |
| KR | 20140028404 A | 3/2014 |
| KR | 20140057052 A | 5/2014 |
| KR | 20140078178 A | 6/2014 |
| KR | 20140108775 A | 9/2014 |
| KR | 20150016808 A | 2/2015 |
| KR | 20160097102 A | 8/2016 |
| KR | 20170099626 A | 9/2017 |
| KR | 20190037967 A | 4/2019 |
| KR | 20190084669 A | 7/2019 |
| KR | 102029287 B1 | 10/2019 |
| KR | 20190119924 A | 10/2019 |
| KR | 20200100294 A | 8/2020 |

OTHER PUBLICATIONS

Korean Office Action Issued In KR Application No. 10-2020-0134160; Mail Date Oct. 15, 2024; 18 Pages.

Korean Notice of Allowance Issued In KR Application No. 10-2020-0134160; Mail Date Aug. 9, 2025; 9 pages.

* cited by examiner

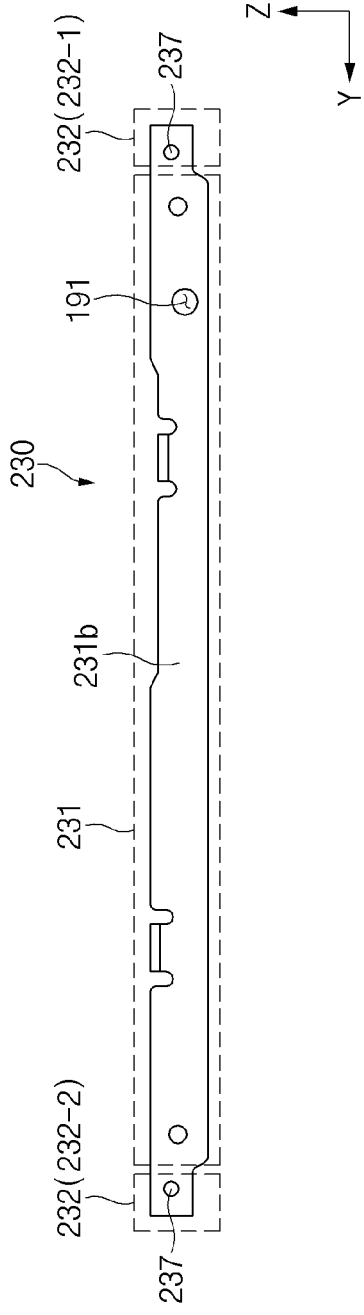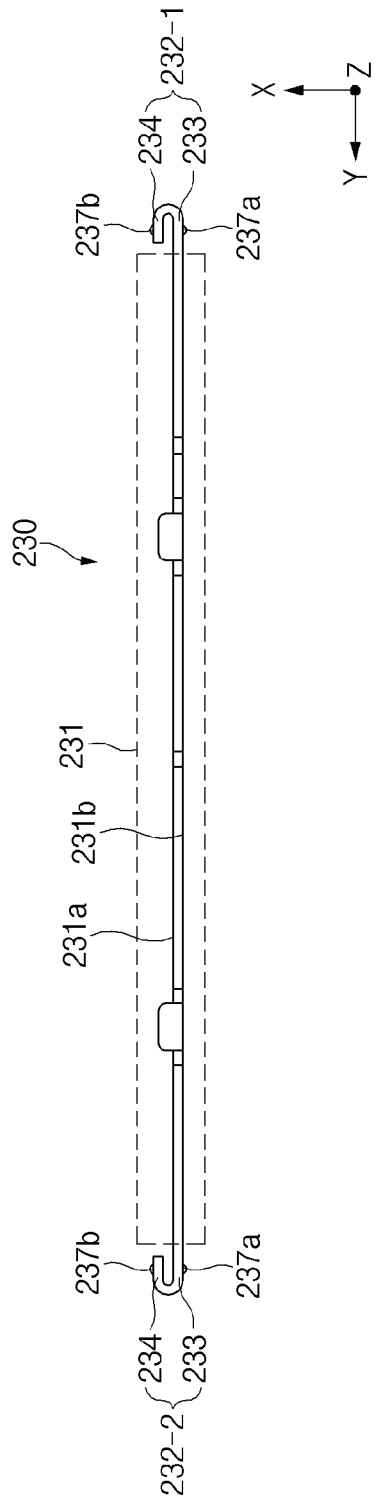
FIG. 7A
FIG. 7B

ELECTRONIC DEVICE COMPRISING SIDE KEY

CROSS-REFERENCE TO RELATED APPLICATION(S)

This application is a continuation application, claiming priority under § 365(c), of International Application No. PCT/KR2021/014252, filed on Oct. 14, 2021, which is based on and claims the benefit of Korean patent application number 10-2020-0134160, filed on Oct. 16, 2020, in the Korean Intellectual Property Office, the disclosures of which are incorporated by reference herein in their entireties.

TECHNICAL FIELD

Embodiments of the disclosure described herein relate to an electronic device including a side key, and more particularly, relate to an electronic device including a fixing structure for a side key bracket.

BACKGROUND ART

An electronic device may include an input device including a button, a switch, or a key disposed in the housing of the electronic device to turn power on/off or to control a function of the electronic device. For example, a key assembly (e.g., a side key) may be installed on a side surface of the housing of the electronic device. The side key may be installed on the side surface of the housing and may operate in conjunction with a switch located inside the housing. When a user clicks the side key, the switch may be pressed by the side key, and a signal indicating that the switch is pressed may be input to a control module (e.g., a processor) disposed in the electronic device. Accordingly, a specific function of the electronic device may be controlled.

DISCLOSURE

Technical Problem

The side key may be inserted into a key-hole formed in the side surface of the housing and may be assembled to the housing. A key bracket supporting a key circuit board may be coupled to the inside of the housing to face the side key. The side key may be configured to press the switch on the key circuit board while moving in the key-hole depending on a click operation of the user.

The key bracket may be fixed to a support structure (e.g., a key bracket seating recess) of the housing. However, the key bracket may not be stably fixed to the seating recess and may be loosely inserted into the seating recess or may be lifted. Furthermore, the key bracket may not only be separated from the seating recess, but may also press the side key to deteriorate the feeling of clicking the side key.

Embodiments of the disclosure provide an electronic device for preventing separation of a key bracket and improving the feeling of clicking a side key by including a fixing structure capable of stably fixing the key bracket to the housing.

Technical Solution

An electronic device according to an embodiment of the disclosure includes a housing having a key-hole formed therein, a key coupled to the housing so as to be at least partially disposed in the key-hole, a key circuit board that is disposed inside the housing and that includes a switch, the switch being disposed on one surface of the key circuit board and pressed by the key, a key bracket that supports the key circuit board such that at least a portion of the key circuit board faces the key, a support structure formed in the housing to support the key bracket and a fixing structure that fixes the key bracket to the housing. The fixing structure includes a first locking protrusion disposed in one of the housing and the key bracket and one of a locking hole and a locking jaw disposed in the other one of the housing and the key bracket so as to be fastened with the first locking protrusion.

An electronic device according to an embodiment of the disclosure includes a housing including a front surface, a rear surface that faces away from the front surface, and a side surface that surrounds an inner space between the front surface and the rear surface, a key-hole being formed in a partial area of the side surface, a printed circuit board disposed in the inner space, a side key that is at least partially inserted into the key-hole and that moves in the key-hole by a click operation, a key circuit board that is disposed in the inner space and that includes a switch pressed by the side key, a connecting terminal electrically connected with the printed circuit board being disposed on at least a portion of the key circuit board, a key bracket on which at least a portion of the key circuit board is seated and that supports the key circuit board such that the key circuit board is fixed in the inner space, and a fixing structure that fixes the key bracket to the housing. The fixing structure includes a first locking protrusion disposed in one of the housing and the key bracket and one of a locking hole and a locking jaw disposed in the other one of the housing and the key bracket so as to be fastened with the first locking protrusion.

Advantageous Effects

The electronic device according to the various embodiments of the disclosure may include the fixing structure capable of stably fixing the key bracket to the housing, thereby preventing separation of the key bracket and improving the feeling of clicking the side key.

Furthermore, the electronic device according to the various embodiments of the disclosure may facilitate assembly of the key bracket through the fixing structure to which the locking structure (e.g., a hook structure) is applied.

Moreover, the electronic device according to the various embodiments of the disclosure may include the locking structure formed on the support structure of the housing and the key bracket, and thus the fixing structure may be applicable without a change in size in the same mounting space.

In addition, the disclosure may provide various effects that are directly or indirectly recognized.

DESCRIPTION OF DRAWINGS

FIG. 7A is a side view illustrating a key bracket of the electronic device according to an embodiment.

FIG. 7B is a side view illustrating the key bracket of the electronic device according to an embodiment.

With regard to description of the drawings, identical or similar reference numerals may be used to refer to identical or similar components.

MODE FOR INVENTION

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Figure 1:
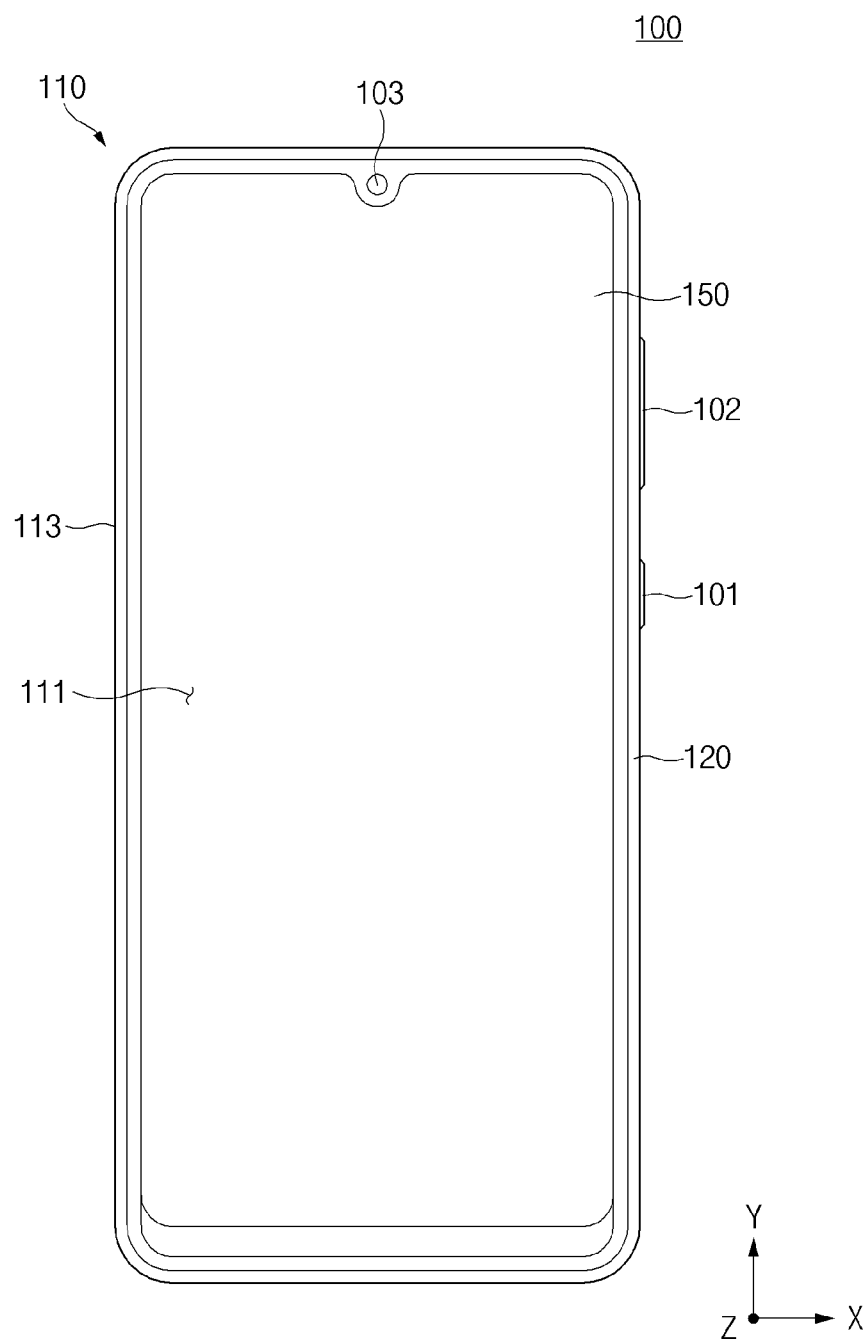
FIG. 1 is a plan view illustrating a front surface of an electronic device according to an embodiment.
Figure 2:
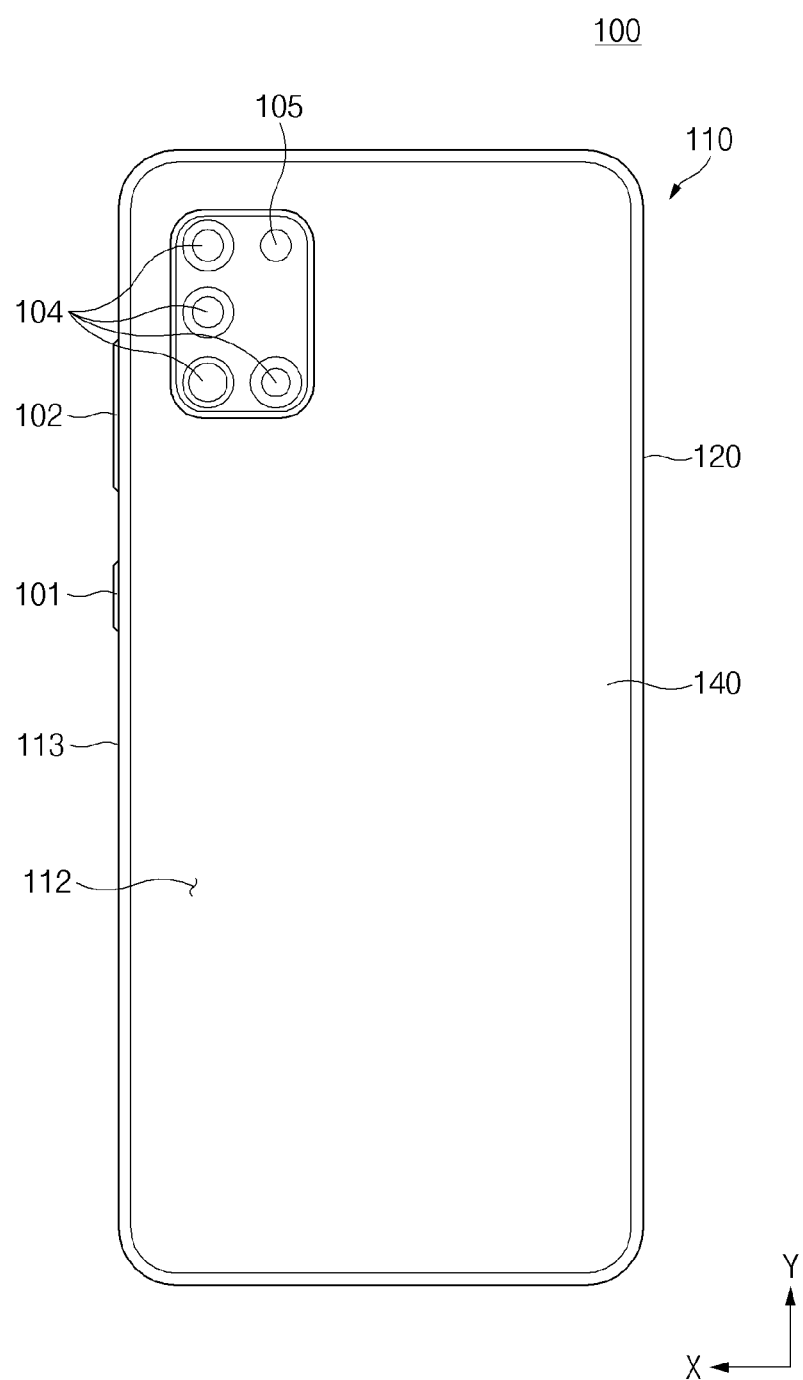
FIG. 2 is a plan view illustrating a rear surface of the electronic device according to an embodiment.

FIG. 1 is a plan view illustrating a front surface of an electronic device according to an embodiment. FIG. 2 is a plan view illustrating a rear surface of the electronic device according to an embodiment.

Referring to FIGS. 1 and 2, the electronic device 100 according to an embodiment may include a housing 110 that includes a front surface 111 (e.g., a surface facing in the +z-axis direction), a rear surface 112 (e.g., a surface facing in the −z-axis direction), and side surfaces 113 (e.g., surfaces facing in the +x/−x-axis directions and/or surfaces facing in the +y/−y-axis directions) that surround a space between the front surface 111 and the rear surface 112. According to various embodiments of the disclosure, the housing 110 may refer to a structure that forms some of the front surface 111, the rear surface 112, and the side surfaces 113.

In an embodiment, the front surface 111 may be formed by a front plate (not illustrated), at least a portion of which is substantially transparent (e.g., a glass plate including various coating layers, or a polymer plate). The rear surface 112 may be formed by a back plate 140 that is substantially opaque. The back plate 140 may be formed of, for example, coated or colored glass, ceramic, a polymer, metal (e.g., aluminum, stainless steel (STS), or magnesium), or a combination of at least two of the aforementioned materials. The side surfaces 113 may be formed by a first support member 120 (e.g., a side bezel structure) that is coupled with the front plate (not illustrated) and the back plate 140 and that includes metal and/or a polymer. According to various embodiments of the disclosure, the back plate 140 and the first support member 120 may be integrally formed with each other and may include the same material (e.g., a metallic material such as aluminum).

Figure 23:
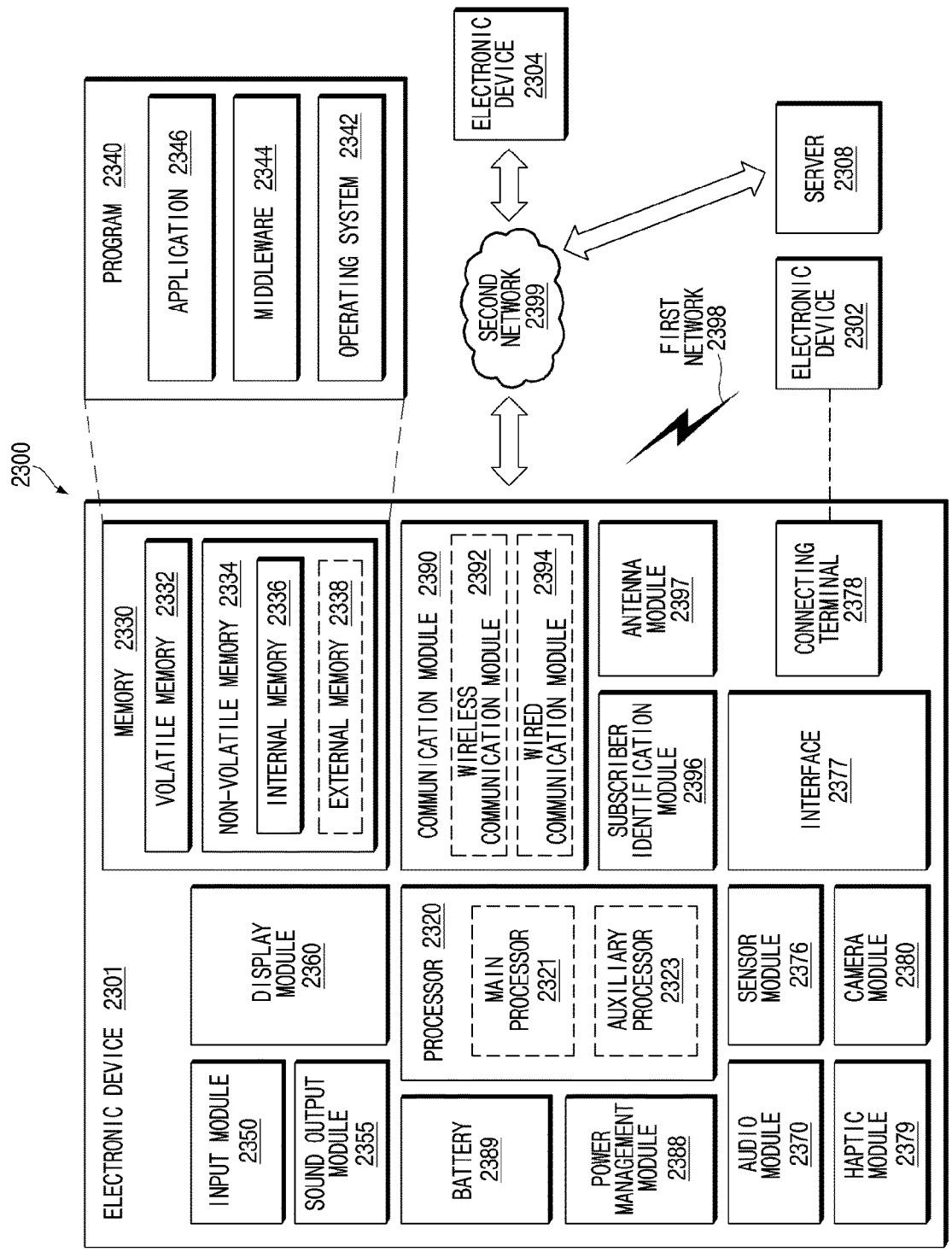
FIG. 23 is a block diagram of an electronic device in a network environment according to various embodiments.

In an embodiment, the electronic device 100 may include at least one of a display 150 (e.g., a display module 2360 of FIG. 23), camera modules 103, 104, and 105 (e.g., a camera module 2380 of FIG. 23), key input devices 101 and 102 (e.g., an input module 2350 of FIG. 23), a sensor module (not illustrated) (e.g., a sensor module 2376 of FIG. 23), or a connector hole (not illustrated) (e.g., a connecting terminal 2378 of FIG. 23). According to various embodiments of the disclosure, the electronic device 100 may not include at least one of the aforementioned components, or may additionally include other component(s).

In an embodiment, the display 150 may be visually exposed outside the electronic device 100 through the front surface 111 of the housing 110. For example, at least a portion of a surface of the housing 110 may include a screen display area formed as the display 150 is visually exposed. For example, the screen display area may be formed in at least a portion of the front surface 111 of the housing 110. The display 150 may be coupled with, or disposed adjacent to, touch detection circuitry, a pressure sensor capable of measuring the intensity (pressure) of a touch, and/or a digitizer for detecting a stylus pen of a magnetic field type.

According to various embodiments of the disclosure, the screen display area may include a sensing area (not illustrated) that is configured to obtain biometric information of a user. When the screen display area includes the sensing area, this may mean that at least a portion of the sensing area overlaps the screen display area. For example, the sensing area may refer to an area capable of displaying visual information by the display 150 like the other areas of the screen display area and additionally obtaining the user's biometric information (e.g., fingerprint).

In an embodiment, the camera modules 103, 104, and 105 may include the first camera module 103 (e.g., a punch hole camera) exposed on the front surface 111 of the housing 110, the second camera module 104 exposed on the rear surface 112 of the housing 110, and the flash 105. The first camera module 103 and the second camera module 104 may include one or more lenses, an image sensor, and/or an image signal processor. The flash 105 may include a light emitting diode or a xenon lamp. According to various embodiments of the disclosure, two or more lenses (an IR camera lens, a wide angle lens, and a telephoto lens) and image sensors may be disposed on one surface of the electronic device 100.

In an embodiment, the first camera module 103 may be visually exposed through a portion of the screen display area of the display 150. For example, the first camera module 103 may be exposed on a partial area of the front surface 111 of the housing 110 and/or the screen display area through an opening (not illustrated) that is formed in a portion of the display 150.

In an embodiment, the second camera module 104 may include a plurality of camera modules (e.g., a dual camera, a triple camera, or a quad camera). However, the second camera module 104 is not necessarily limited to including the plurality of camera modules and may include one camera module.

In an embodiment, the key input devices 101 and 102 (e.g., a key assembly 200 of FIGS. 4 to 6 or the input module 2350 of FIG. 23) may be disposed on the side surfaces 113 of the housing 110. For example, the key input devices 101 and 102 may include at least one side key or side button disposed on the first support member 120 of the housing 110. According to various embodiments of the disclosure, the electronic device 100 may not include all or a part of the key input devices 101 and 102, and the key input devices 101 and 102, which are not included, may be implemented in a different form, such as a soft key, on the display 150.

In an embodiment, the electronic device 100 may perform a function of turning on/off a screen of the display 150 in response to inputs of the key input devices 101 and 102. Alternatively, the electronic device 100 may perform a function of adjusting voice call volume or multimedia file playback volume in response to inputs of the key input devices 101 and 102. For example, the key input devices 101 and 102 may include a power key (e.g., 101) or a volume key (e.g., 102). According to various embodiments of the disclosure, the key input devices 101 and 102 may be configured to receive and/or obtain biometric information (e.g., a fingerprint) of the user. For example, the key input devices 101 and 102 may be implemented with a fingerprint sensing button capable of sensing a fingerprint. The key input devices 101 and 102 may include a fingerprint sensor module (not illustrated) and may be configured to sense a fingerprint of the user through the fingerprint sensor module when a body (e.g., a finger) of the user is brought into contact with the key input devices 101 and 102.

In an embodiment, the sensor module (not illustrated) (e.g., the sensor module 2376 of FIG. 23) may generate an electrical signal or a data value that corresponds to an operational state inside the electronic device 100 or an environmental state external to the electronic device 100. For example, the sensor module may include at least one of a proximity sensor, an HRM sensor, a fingerprint sensor, a gesture sensor, a gyro sensor, an atmospheric pressure sensor, a magnetic sensor, an acceleration sensor, a grip sensor, a color sensor, an infrared (IR) sensor, a biosensor, a temperature sensor, a humidity sensor, or an illuminance sensor.

In an embodiment, the connector hole (not illustrated) may accommodate a connector. The connector hole may be disposed in the side surface 113 of the housing 110. In another embodiment, the electronic device 100 may include a first connector hole (not illustrated) capable of accommodating a connector (e.g., a USB connector) for transmitting/receiving power and/or data with an external electronic device, and/or a second connector hole (not illustrated) capable of accommodating a connector (e.g., an earphone jack) for transmitting/receiving an audio signal with an external electronic device.

Figure 3:
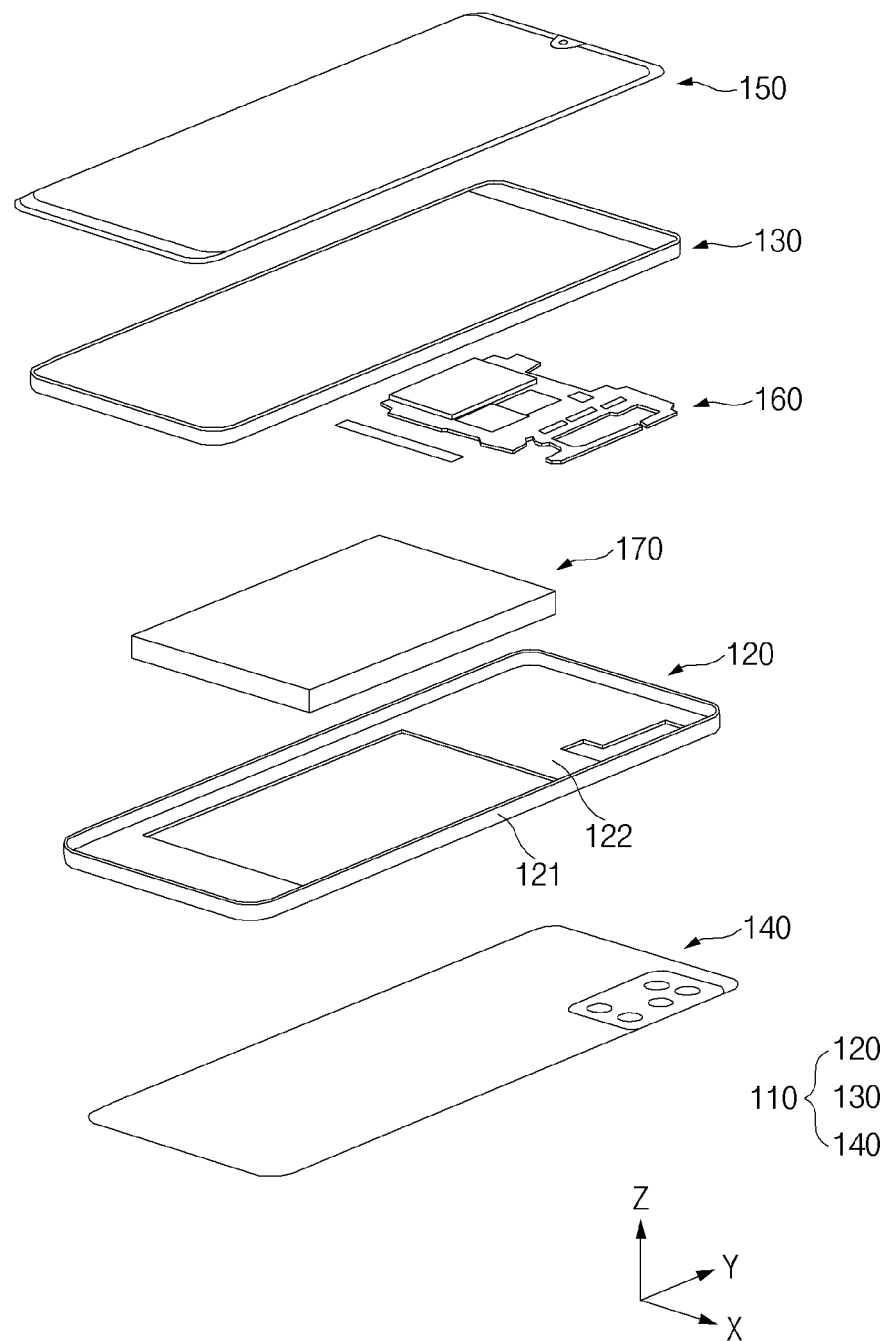
FIG. 3 is an exploded perspective view of the electronic device according to an embodiment.

FIG. 3 is an exploded perspective view of the electronic device according to an embodiment.

Referring to FIG. 3, the electronic device 100 according to an embodiment may include the housing 110, the display 150, a circuit board 160, and a battery 170, and the housing 110 may include the first support member 120 (e.g., a rear case or a side bezel), a second support member 130 (e.g., a front case), and a back plate 140.

According to various embodiments of the disclosure, the electronic device 100 may not include at least one component (e.g., the second support member 130) among the aforementioned components, or may additionally include other component(s). Some of the components of the electronic device 100 of FIG. 3 may be identical or similar to some of the components of the electronic device 100 of FIGS. 1 and 2, and repetitive descriptions will hereinafter be omitted.

In an embodiment, at least some of the first support member 120, the second support member 130, and the back plate 140 may form the housing 110 (e.g., the housing 110 of FIGS. 1 and 2). The first support member 120 may form a part of the side surfaces of the housing 110 (e.g., the side surfaces 113 of FIGS. 1 and 2), and the back plate 140 may form a portion of the rear surface of the housing 110 (e.g., the rear surface 112 of FIGS. 1 and 2). The second support member 130 may support the display 150 such that the display 150 is visually exposed on the front surface of the housing 110 (e.g., the front surface 111 of FIGS. 1 and 3). For example, the housing 110 may be formed of a metallic material and/or a non-metallic (e.g., polymer) material.

In an embodiment, the first support member 120 may include a sidewall 121 that forms a portion of a surface of the electronic device 100 (e.g., the side surfaces 113 of FIGS. 1 and 2) and a plate 122 extending from the sidewall 121 toward the inside of the electronic device 100. The first support member 120 may support other components of the electronic device 100 (e.g., the circuit board 160, the battery 170, and/or the key input devices 101 and 102 of FIGS. 1 and 2). The circuit board 160 and the battery 170 may be disposed on at least a portion of the plate 122. The sidewall 121 may be integrally formed with the plate 122, or may be connected to the plate 122 so as to be detachable.

In an embodiment, the circuit board 160 may be disposed between the first support member 120 and the second support member 130. For example, the circuit board 160 may be supported by the plate 122 of the first support member 120. The circuit board 160 may be electrically connected with various parts included in the electronic device 100. For example, the circuit board 160 may be electrically connected with a substrate (not illustrated) (e.g., a connecting terminal 225 of a key circuit board 220 of FIGS. 4 to 6) included in the key input devices (e.g., the key input devices 101 and 102 of FIGS. 1 and 2). The circuit board 160 may include a printed circuit board (PCB), a flexible PCB (FPCB), or a rigid-flexible PCB (RFPCB).

In an embodiment, a processor (e.g., a processor 2320 of FIG. 23), a memory (e.g., a memory 2330 of FIG. 23), and/or an interface (e.g., an interface 2377 of FIG. 23) may be disposed (or, mounted) on the circuit board 160. For example, the processor may include a main processor (e.g., a main processor 2321 of FIG. 23) and/or an auxiliary processor (e.g., an auxiliary processor 2323 of FIG. 23), and the main processor and/or the auxiliary processor may include one or more of a central processing unit, an application processor, a graphic processing unit, an image signal processor, a sensor hub processor, or a communication processor. For example, the memory may include a volatile memory or a non-volatile memory. For example, the interface may include a high definition multimedia interface (HDMI), a universal serial bus (USB) interface, an SD card interface, and/or an audio interface. Furthermore, the interface may electrically or physically connect the electronic device 100 with an external electronic device and may include a USB connector, an SD card/MMC connector, or an audio connector.

In an embodiment, the battery 170 (e.g., a battery 2389 of FIG. 23) may supply power to at least one of the components of the electronic device 100. The battery 170 may include a primary cell that is not rechargeable, a secondary cell that is rechargeable, or a fuel cell. At least a portion of the battery 170 may be disposed on substantially the same plane as the printed circuit board 160. For example, the battery 170 may be integrally disposed inside the electronic device 100, or may be disposed to be detachable from the electronic device 100.

Figure 4:
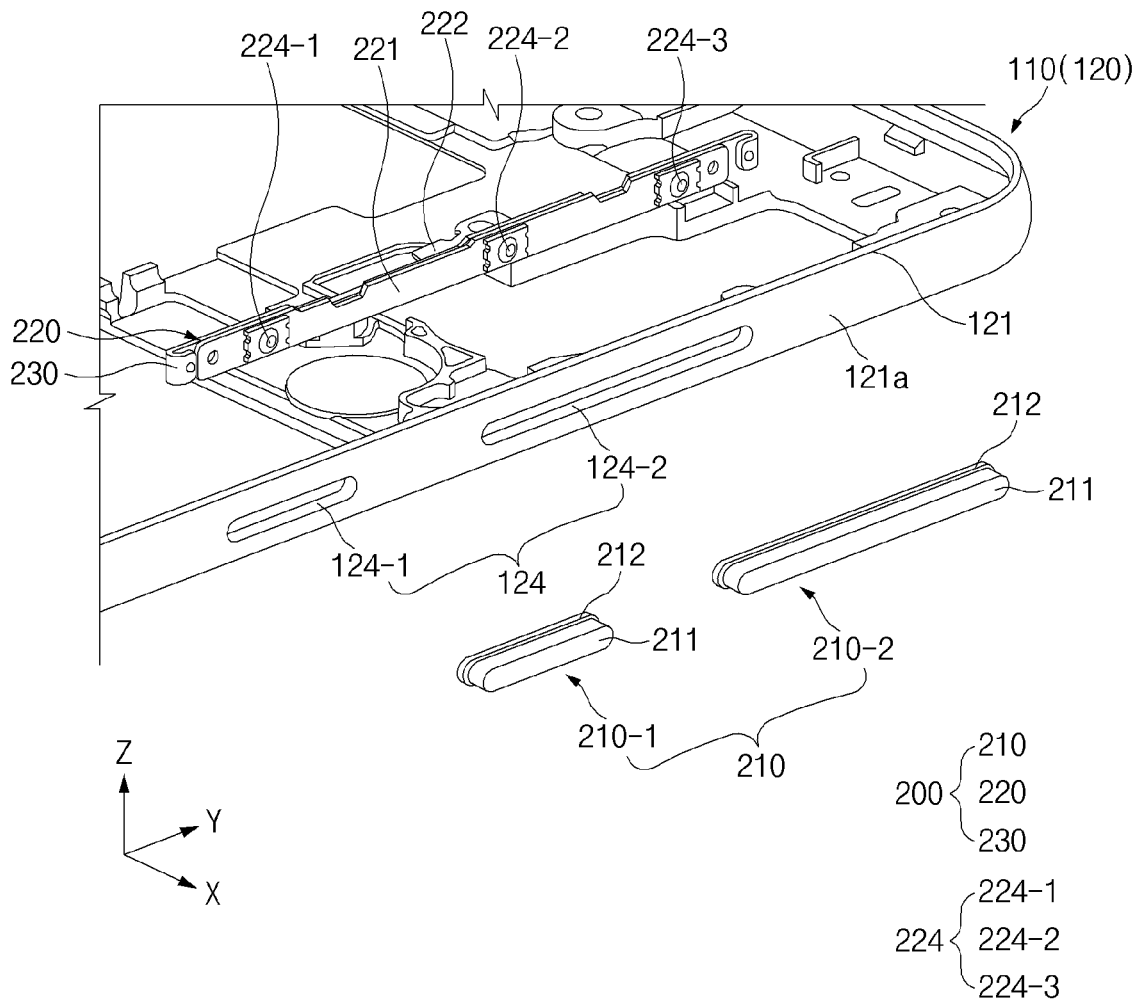
FIG. 4 is a perspective view illustrating a housing and a key assembly of the electronic device according to an embodiment.
Figure 5:
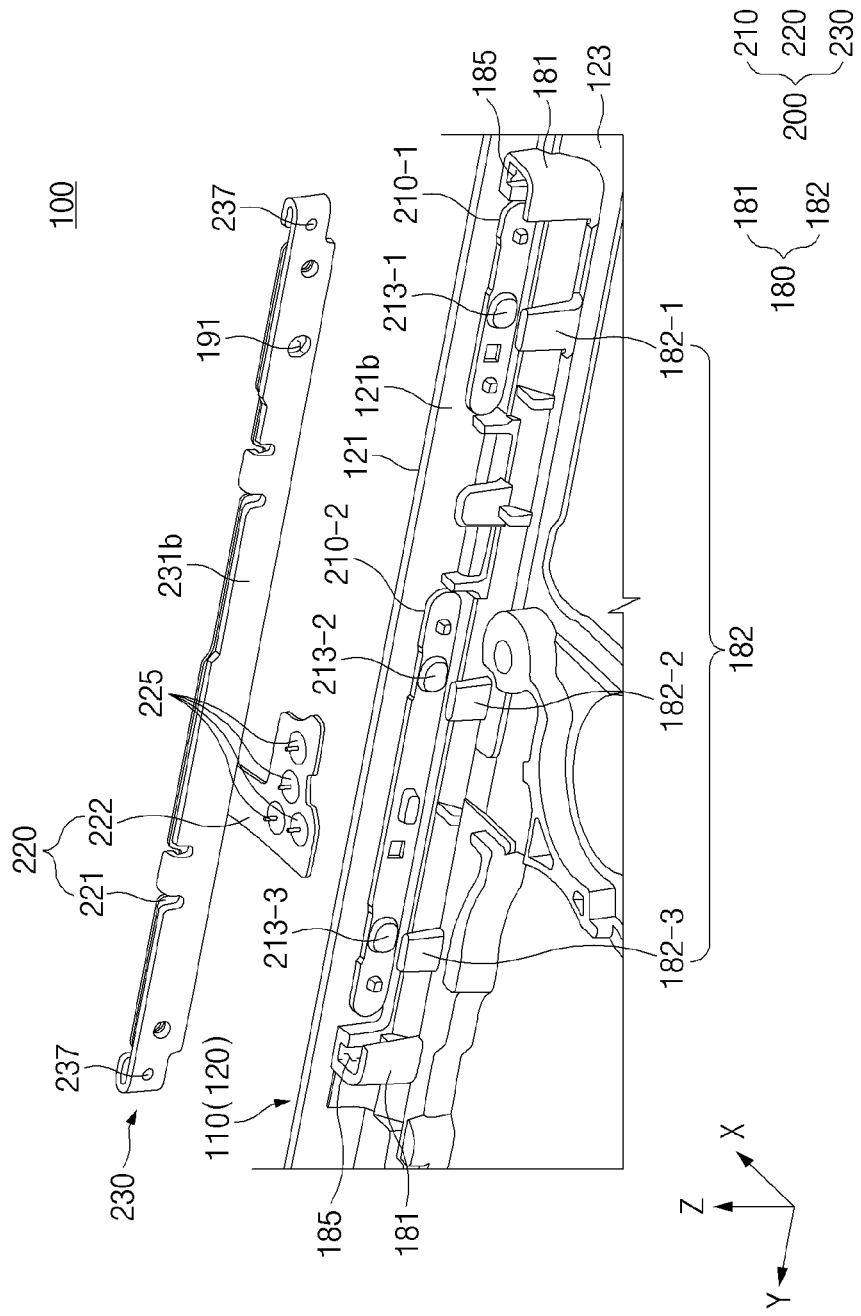
FIG. 5 is a perspective view illustrating the housing and the key assembly of the electronic device according to an embodiment.
Figure 6:
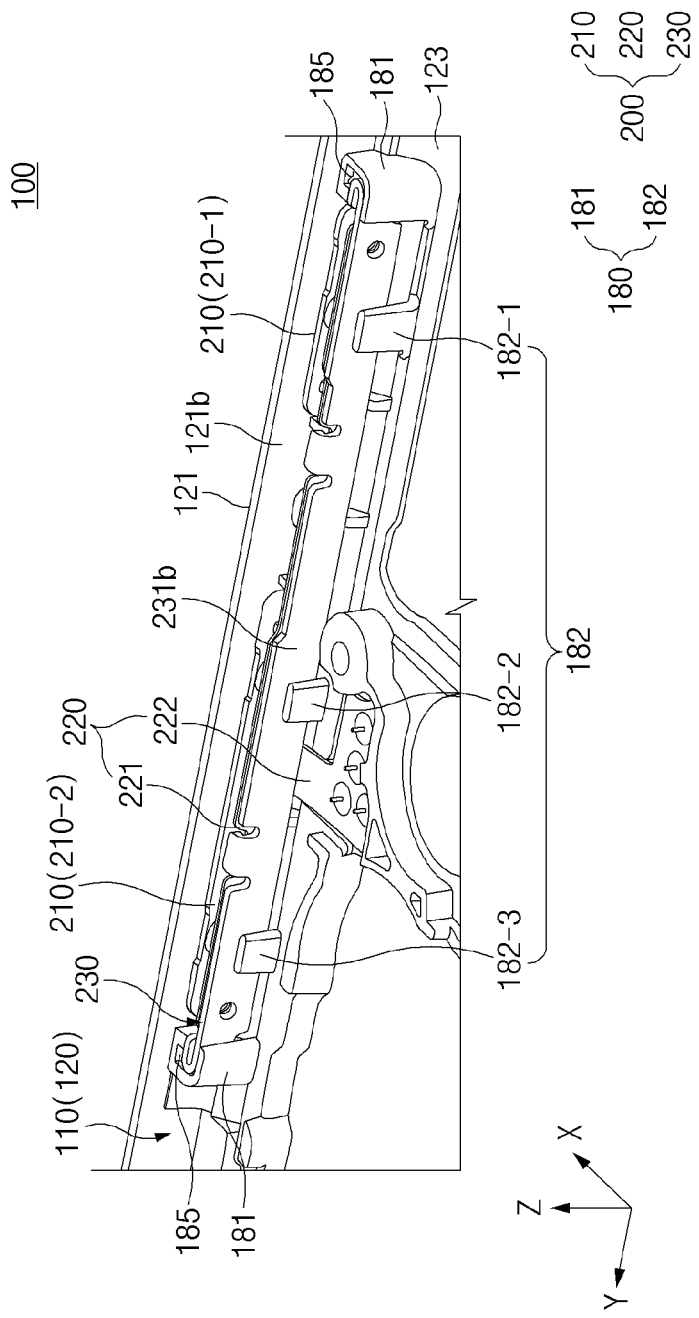
FIG. 6 is a perspective view illustrating the housing and the key assembly of the electronic device according to an embodiment.

FIG. 4 is a perspective view illustrating the housing and the key assembly of the electronic device according to an embodiment. FIG. 5 is a perspective view illustrating the housing and the key assembly of the electronic device according to an embodiment. FIG. 6 is a perspective view illustrating the housing and the key assembly of the electronic device according to an embodiment.

FIG. 4 illustrates a state in which the key assembly is separated from the housing. FIG. 5 illustrates an operation in which the key assembly is assembled to the housing. FIG. 6 illustrates a state in which the key assembly is assembled to the housing.

Referring to FIGS. 4 to 6, the electronic device 100 according to an embodiment may include the housing 110 (e.g., the first support member 120 of FIGS. 1 to 3) and the key assembly 200 (e.g., the key input devices 101 and 102 of FIGS. 1 and 2). The key assembly 200 (e.g., a side key assembly) may be coupled to one side of the housing 110. The key assembly 200 may include a key 210 (e.g., a side key), the key circuit board 220, and a key bracket 230.

In an embodiment, the housing 110 (e.g., the first support member 120) may include a structure to which the key assembly 200 is coupled. The housing 110 may include a key-hole 124 into which at least a portion of the side key 210 is inserted and a support structure 180 that supports the key bracket 230. The housing 110 illustrated in FIGS. 4 to 6 may be referred to as the first support member 120 (e.g., the rear case) illustrated in FIG. 3. For example, the housing 110 may include the first support member 120 that forms at least a part of the side surfaces of the electronic device 100 and the key assembly 200 may be disposed on the first support member 120. The key-hole 124 may be formed in the first support member 120 and the support structure 180 may be formed on the first support member 120.

In an embodiment, the key-hole 124 may be formed in the side wall 121 of the first support member 120. The key-hole 124 may penetrate a partial area of the side wall 121 of the first support member 120. For example, the sidewall 121 of the first support member 120 may include an outer surface 121*a* (see FIG. 4) exposed outside the electronic device 100 and an inner surface 121*b* (see FIG. 6) facing away from the outer surface 121*a*. The key-hole 124 may penetrate from the outer surface 121*a* to the inner surface 121*b* of the sidewall 121. The key-hole 124 may be formed in a shape corresponding to at least a portion of the side key 210 such that the at least a portion of the side key 210 is inserted into the key-hole 124. For example, the key-hole 124 may be formed in an oval shape or a rounded rectangular shape that extends in the lengthwise direction of the electronic device 100 (e.g., the y-axis direction). The key-hole 124 may include a first key-hole 124-1 in which a first side key 210-1 is disposed and a second key-hole 124-2 in which a second side key 210-2 is disposed. The shape of the key-hole 124 and/or the number of key-holes 124 is not limited to the illustrated embodiment.

In an embodiment, the support structure 180 may support the key bracket 230. The support structure 180 may form a space in which the key bracket 230 is disposed and may support the key bracket 230 by surrounding at least a portion of the key bracket 230 or making contact with at least a portion of the key bracket 230. The support structure 180 may be formed inside the first support member 120 so as to be located adjacent to the key-hole 124. The support structure 180 may protrude from a partial area of the first support member 120 by a predetermined height. The support structure 180 may protrude from an edge 123 of a bottom surface (e.g., the plate 122 of FIGS. 1 and 2) of the first support member 120 so as to be located adjacent to the sidewall 121 having the key-hole 124 formed therein. For example, the sidewall 121 may extend from one portion of the edge 123 in a substantially vertical direction (e.g., the +z-axis direction) and the support structure 180 may extend from another portion of the edge 123 in a substantially vertical direction (e.g., the +z-axis direction) to be spaced apart from the sidewall 121 in a direction toward the inside of the first support member 120 (e.g., the −x-axis direction).

In an embodiment, the support structure 180 may include a pair of first support parts 181 in which opposite end portions of the key bracket 230 (e.g., opposite end portions 232 of FIG. 7A) are disposed and at least one second support part 182 making contact with one surface of the key bracket 230.

In an embodiment, the pair of first support parts 181 may be disposed to face each other and may be symmetrical to each other. The pair of first support parts 181 may have receiving recesses 185 formed therein in which at least portions of the key bracket 230 (e.g., the opposite end portions 232 of FIG. 7) are accommodated. For example, the pair of first support parts 181 may surround at least parts of the opposite end portions of the key bracket 230.

In an embodiment, the second support part 182 may be disposed between the pair of first support parts 181 and may include one or more components. The second support part 182 may be disposed to face the sidewall 121 of the first support member 120 with the key bracket 230 therebetween. The second support part 182 may contact one surface of the key bracket 230 (e.g., a second surface 231b of the key bracket 230) and may support a central portion of the key bracket 230 (e.g., a base part 231 of the key bracket 230 of FIGS. 7A and 7B). Accordingly, in a push operation of the side key 210, the central portion of the key bracket 230 may be prevented from being moved toward the inside of the first support member 120 or deformed while being bent.

According to the illustrated embodiment, the first support member 120 may include three second support parts 182. For example, the second support part 182 may include a first structure 182-1, a second structure 182-2, and a third structure 182-3 spaced apart from each other. However, without being limited to the illustrated embodiment, the number of structures included in the second support part 182 may be changed. For example, the second support part 182 may include one or two structures, or may include four or more structures.

In an embodiment, the side key 210 may be inserted into the key-hole 124. At least a portion of the side key 210 may be exposed outside the electronic device 100 (or, the housing 110) through the key-hole 124. For example, one portion of the side key 210 may be located inside the first support member 120, and another portion of the side key 210 may be located outside the first support member 120. The side key 210 may receive an external force from the user and may be configured to be moved toward the inside of the housing 110 by the external force.

In an embodiment, the side key 210 may include a body 211 and a flange 212 extending from the body 211 in a direction perpendicular thereto. The side key 210 may be inserted into the key-hole 124 from inside the first support member 120. The side key 210 may be inserted into the key-hole 124 toward the outside in a state of being located inside the first support member 120. For example, the direction in which the side key 210 is inserted into the key-hole 124 may be a direction substantially opposite to the direction in which the side key 210 is pressed when the user clicks the side key 210 (e.g., the direction toward the inside of the housing 110 (or, the first support member 120)). When the side key 210 is inserted into the key-hole 124, at least a portion of the body 211 may be exposed on the outer surface 121a of the first support member 120, and the flange 212 may be supported on the inner surface 121b of the first support member 120. The flange 212 may be stopped by the inner surface 121b and may prevent separation of the side key 210 from the first support member 120.

In an embodiment, the side key 210 may include the first side key 210-1 inserted into the first key-hole 124-1 and the second side key 210-2 inserted into the second key-hole 124-2. The second side key 210-2 may be formed to be longer than the first side key 210-1. The first side key 210-1 and the second side key 210-2 may be configured to press different switches 224, respectively. For example, the first side key 210-1 may include a first pressure protrusion 213-1 configured to press a first switch 224-1. As shown in FIG. 5, the second side key 210-2 may include a second pressure protrusion 213-2 and a third pressure protrusion 213-3 that are configured to press a second switch 224-2 and a third switch 224-3. The first side key 210-1 and the second side key 210-2 may be implemented with input devices (e.g., the key input devices 101 and 102 of FIGS. 1 and 2) for performing different inputs. For example, the first side key 210-1 may be configured to perform a function of a power key, and the second side key 210-2 may be configured to perform a function of a volume key. The shape, number, and/or function of side keys 210 may be changed according to various embodiments of the disclosure.

In an embodiment, the key circuit board 220 may be disposed on the key bracket 230 to face the side key 210. The key circuit board 220 may be configured to transfer an electrical signal to control circuitry of the electronic device 100 (e.g., the processor 2320 of FIG. 23) as at least a portion of the key circuit board 220 is brought into contact with and separated from the side key 210 by a push operation of the side key 210. The key circuit board 220 may include the switches 224 making contact with at least portions of the side key 210 and the connecting terminal 225 electrically connected with a main board of the electronic device 100 (e.g., the circuit board 160 of FIG. 3).

In an embodiment, the key circuit board 220 may include a first substrate 221 disposed on one surface of the key bracket 230 to face the side key 210 and a second substrate 222 perpendicularly extending from a portion of the first substrate 221 toward the inside of the first support member 120. At least one switch 224 may be disposed on the first substrate 221. At least one connecting terminal 225 may be disposed on the second substrate 222. For example, the key circuit board 220 may include a printed circuit board (PCB), a flexible PCB (FPCB), or a rigid-flexible PCB (RFPCB).

In an embodiment, the switch 224 may be disposed on the first substrate 221 so as to be pressed by the side key 210. The switch 224 may be pressed by a pressure protrusion 213 of the side key 210 depending on a click operation of the side key 210 and may generate an electrical signal for an input operation of the side key 210. The switch 224 may include an elastic material and may be elastically deformed into a predetermined shape as the switch 224 is pressed by the side key 210 or the pressing of the switch 224 is released. The switch 224 may include a dome switch, and the dome switch may be mounted on one surface of the first substrate 221 by surface mounting technology (SMT).

In an embodiment, the switch 224 may include the first switch 224-1 pressed by the first side key 210-1 and the second switch 224-2 and the third switch 224-3 that are pressed by the second side key 210-2. For example, the first switch 224-1 may be pressed by the first pressure protrusion 213-1. The second switch 224-2 may be pressed by the second pressure protrusion 213-2. The third switch 224-3 may be pressed by the third pressure protrusion 213-3. The first switch 224-1, the second switch 224-2, and the third switch 224-3 may be disposed on the first substrate 221 of the key circuit board 220 to correspond to the first pressure protrusion 213-1, the second pressure protrusion 213-2, and the third pressure protrusion 213-3, respectively. For example, the first switch 224-1 may be located to face the first pressure protrusion 213-1. The second switch 224-2 may be located to face the second pressure protrusion 213-2. The third switch 224-3 may be located to face the third pressure protrusion 213-3.

In an embodiment, the connecting terminal 225 may be disposed on a partial area of the second substrate 222 so as to be electrically connected with the main board of the electronic device 100 (e.g., the circuit board 160 of FIG. 3). For example, a plurality of connecting terminals 225 may be formed on the second substrate 222. The connecting terminal 225 may include a conductive material and may be electrically connected with the main board 160 by contact with a conductive structure (e.g., a C-clip or a pogo-pin) disposed on the main board 160. The connecting terminal 225 may transfer, to the main board 160, an electrical signal generated as the switch 224 is pressed by a click operation of the side key 210.

In an embodiment, the key bracket 230 may support the key circuit board 220. The key bracket 230 may stably fix the key circuit board 220 (or, the switch 224) to the first support member 120. The first substrate 221 of the key circuit board 220 may be attached to at least a portion of the key bracket 230. The key bracket 230 may be supported by the support structure 180 of the first support member 120 and may be fixed to the first support member 120. For example, the key bracket 230 may include a first surface (not illustrated) that faces the inner surface 121*b* of the sidewall 121 and the second surface 231*b* that faces away from the first surface. The key circuit board 220 may be disposed on the first surface of the key bracket 230, and the second support part 182 may contact the second surface 231*b* of the key bracket 230. The opposite end portions of the key bracket 230 may be vertically inserted into the receiving recesses 185 of the first support parts 181.

According to the illustrated embodiment, a locking hole 191 for providing a fixing structure (or, a locking structure) between the key bracket 230 and the second support part 182 may be formed in at least a portion of the key bracket 230, and contact protrusions 237 for preventing separation of the key bracket 230 from the receiving recesses 185 may be formed on the opposite end portions of the key bracket 230. A structure in which the key bracket 230 is fixed to the first support member 120 (or, the support structure 180) will be described below in more detail with reference to FIGS. 7A and 7B to 9.

Figure 8:
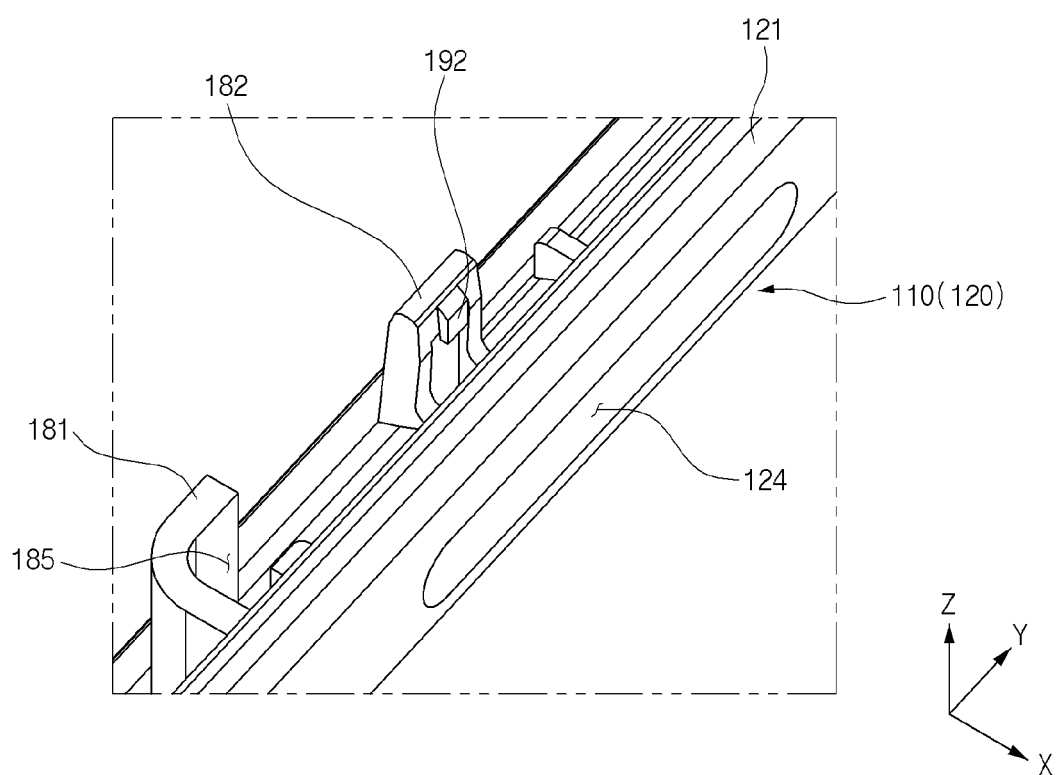
FIG. 8 is a perspective view illustrating a portion of a rear case of the electronic device according to an embodiment.
Figure 9A:
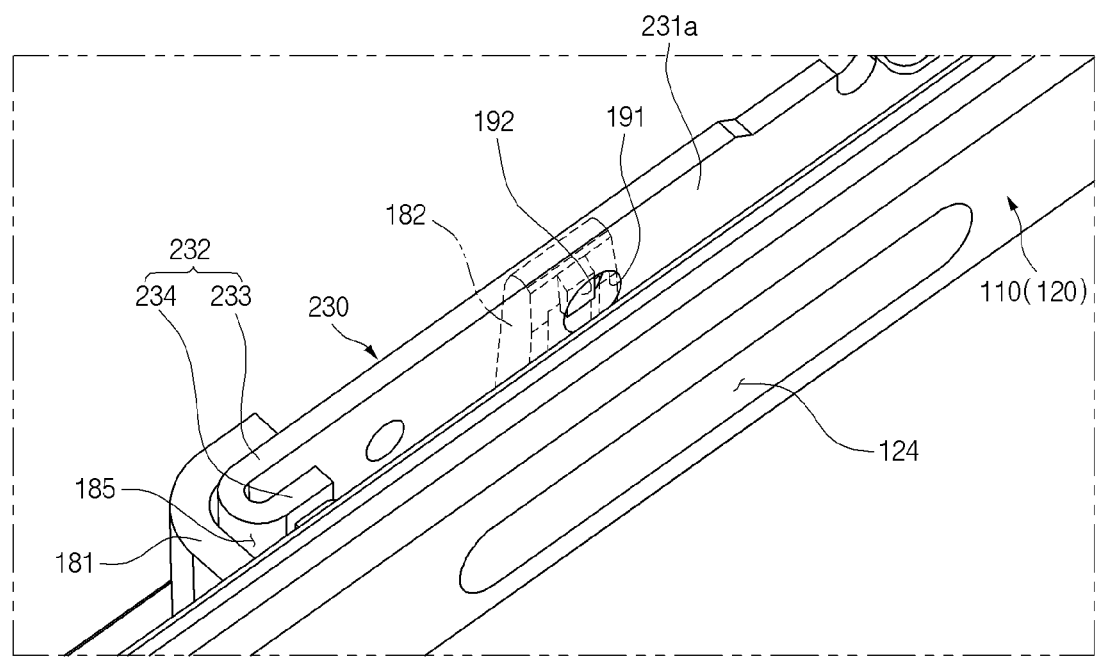
FIG. 9A is a perspective view illustrating a state in which the key bracket of the electronic device is coupled to the rear case according to an embodiment.
Figure 9B:
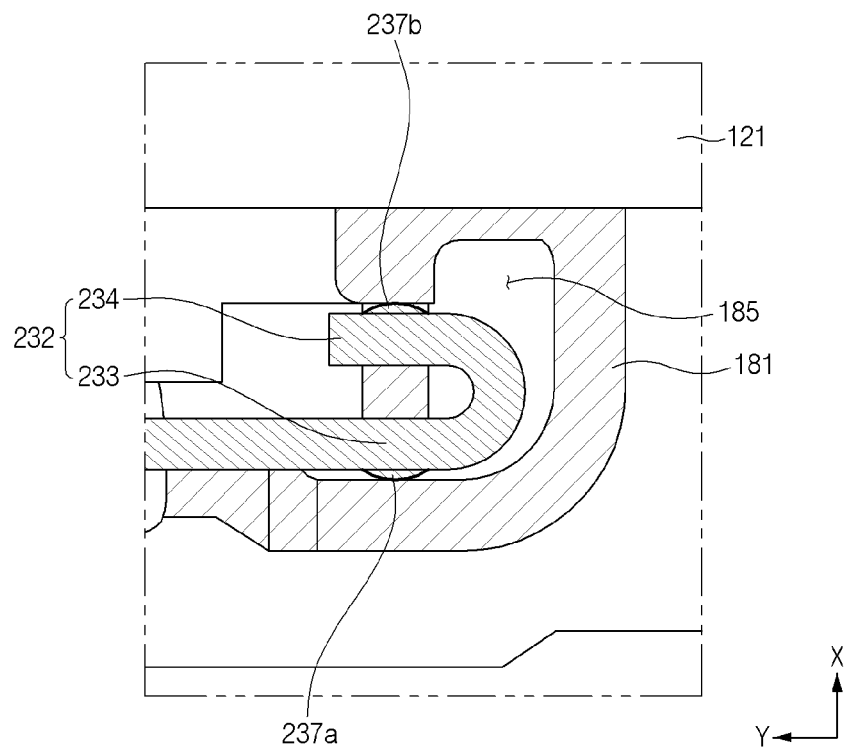
FIG. 9B is a side view illustrating the state in which the key bracket of the electronic device is coupled to the rear case according to an embodiment.

FIGS. 7A and 7B (hereinafter, referred to as FIG. 7) are side views illustrating the key bracket of the electronic device according to an embodiment. FIG. 8 is a perspective view illustrating a portion of the rear case of the electronic device according to an embodiment. FIGS. 9A and 9B (hereinafter, referred to as FIG. 9) are perspective views illustrating a state in which the key bracket of the electronic device is coupled to the rear case according to an embodiment.

Referring to FIGS. 7 to 9, the electronic device according to an embodiment (e.g., the electronic device 100 of FIGS. 1 to 6) may include the first support member 120 including the support structure 181 and 182 and the key bracket 230 supported by the support structure 181 and 182. The components illustrated in FIGS. 7 to 9 are identical or similar to some of the components of the electronic device 100 of FIGS. 1 to 6, and therefore repetitive descriptions will hereinafter be omitted.

In an embodiment, the key bracket 230 may be coupled to the first support member 120. For example, the key bracket 230 may be supported by the support structure 181 and 182 of the first support member 120 and may be fixed to the first support member 120. The key bracket 230 may be formed of a material having a specified stiffness or higher. For example, the key bracket 230 may be formed of a metallic material including stainless steel (SUS), but is not limited thereto. The key bracket 230 may include the base part 231 extending to a predetermined length and a first end portion 232-1 and a second end portion 232-2 that extend from the base part 231 in opposite directions.

In an embodiment, the base part 231 may include the first surface 231*a* and the second surface 231*b* facing away from the first surface 231*a*. The first surface 231*a* may face the sidewall 121 of the first support member 120, and the key circuit board (e.g., the key circuit board 220 of FIGS. 4 to 6) may be disposed on the first surface 231*a*. The second surface 231*b* may face the second support part 182 of the first support member 120 (e.g., refer to FIGS. 4 to 6). The base part 231 may partially make contact with at least one second support part 182 and may be supported by the second support part 182.

In an embodiment, the locking hole 191 may be formed in at least a partial area of the base part 231. The locking hole 191 may penetrate the first surface 231*a* and the second surface 231*b* in a direction perpendicular thereto. A first locking protrusion 192 of the second support part 182 may be inserted into the locking hole 191. According to the illustrated embodiment, one locking hole 191 may be formed in the base part 231. However, the numbers and/or positions of locking holes 191 are not limited to the illustrated embodiment. According to various embodiments of the disclosure, a plurality of locking holes 191 may be formed in the base part 231, and in addition, the position of the locking hole 191 may be changed.

In an embodiment, the first end portion 232-1 may extend from the base part 231 in one direction and the second end portion 232-2 may extend from the base part 231 in an opposite direction. The first end portion 232-1 and the second end portion 232-2 may form the opposite end portions of the key bracket 230. The first end portion 232-1 and the second end portion 232-2 may be formed in substantially the same shape and may be symmetrical to each other with respect to the base part 231. The first end portion 232-1 and the second end portion 232-2 may be supported by the pair of first support parts 181. For example, the first end portion 232-1 and the second end portion 232-2 may be inserted into the receiving recesses 185 of the first support parts 181, respectively.

In an embodiment, each of the first end portion 232-1 and the second end portion 232-2 may be formed in a shape in which at least a portion is bent. The first end portion 232-1 may include a first portion 233 extending from the base part 231 in the one direction and a second portion 234 bent from the first portion 233 toward the first surface 231*a*. For example, the first end portion 232-1 may be formed in a bent shape such that the second portion 234 faces at least part of the first portion 233. The second end portion 232-2 may include a first portion 233 extending from the base part 231 in the opposite direction and a second portion 234 bent from the first portion 233 toward the first surface 231*a*. For example, the second end portion 232-2 may be formed in a bent shape such that the second portion 234 faces at least part of the first portion 233. The first end portion 232-1 and the second end portion 232-2 may be formed in the shape of "U" or "⊂". Each of the first end portion 232-1 and the second end portion 232-2 may be elastically deformed such that the first portion 233 and the second portion 234 move away from or toward each other.

In an embodiment, each of the first end portion 232-1 and the second end portion 232-2 may include the contact protrusion 237. The contact protrusion 237 may include a first contact protrusion 237*a* and a second contact protrusion 237*b* facing away from each other. For example, the first contact protrusion 237*a* protruding in the direction of the second surface 231*b* may be formed on the first portion 233 of the first end portion 232-1, and the second contact protrusion 237*b* protruding in the direction of the first surface 231*a* may be formed on the second portion 234 of the first end portion 232-1. Furthermore, the first contact protrusion 237a protruding in the direction of the second surface 231b may be formed on the first portion 233 of the second end portion 232-1, and the second contact protrusion 237b protruding in the direction of the first surface 231a may be formed on the second portion 234 of the first end portion 232-1.

In an embodiment, the first support member 120 may include the support structure 181 and 182 that supports the key bracket 230. The support structure 181 and 182 may include the first support parts 181 having the receiving recesses 185 formed therein and the second support part 182 having the first locking protrusion 192 formed thereon. The first support parts 181 may support the first end portion 232-1 and the second end portion 232-2 of the key bracket 230. The second support part 182 may support the base part 231 of the key bracket 230.

In an embodiment, the first support parts 181 may be symmetrically paired to support the first end portion 232-1 and the second end portion 232-2 of the key bracket 230, respectively (e.g., refer to FIGS. 4 to 6). The first support parts 181 may include the receiving recesses 185 into which the first end portion 232-1 and the second end portion 232-2 of the key bracket 230 are inserted. The receiving recesses 185 may surround the first end portion 232-1 and the second end portion 232-2. The key bracket 230 may be fixed to and/or supported on the first support member 120 as the first end portion 232-1 and the second end portion 232-2 are inserted into the receiving recesses 185.

In an embodiment, the second support part 182 may include the first locking protrusion 192 corresponding to the locking hole 191 of the key bracket 230. The first locking protrusion 192 may protrude from one surface of the second support part 182 (e.g., a surface facing the sidewall 121 of the first support member 120) toward the sidewall 121 by a specified height. At least a portion of the first locking protrusion 192 may be inserted into the locking hole 191. As described above with reference to FIGS. 4 to 6, the first support member 120 may include one or more second support parts 182. In a case in which a plurality of second support parts 182 are provided according to various embodiments of the disclosure, the first locking protrusion 192 may be formed only on a part of the plurality of second support parts 182, or may be formed on all of the plurality of second support parts 182. In this case, one or more locking holes 191 may be formed in the base part 231 to correspond to the number and/or positions of second support parts 182 having the first locking protrusion 192 formed thereon.

The electronic device 100 according to an embodiment may be configured such that the key bracket 230 is stably fixed to and/or supported on the first support member 120 by the first support parts 181 and the second support part 182. The first locking protrusion 192 of the second support part 182 may be inserted into the locking hole 191 with the key bracket 230 coupled to the first support member 120 and may support the key bracket 230 such that the key bracket 230 is not separated from the first support member 120 (e.g., FIG. 9A). In addition, the opposite end portions 232 of the key bracket 230 may be configured such that the contact protrusions 237 make contact with inner sidewalls of the first support parts 181 when the opposite end portions 232 are inserted into the receiving recesses 185. Accordingly, the opposite end portions 232 of the key bracket 230 may be fixed in an interference-fit manner (e.g., FIG. 9B).

Figure 10:
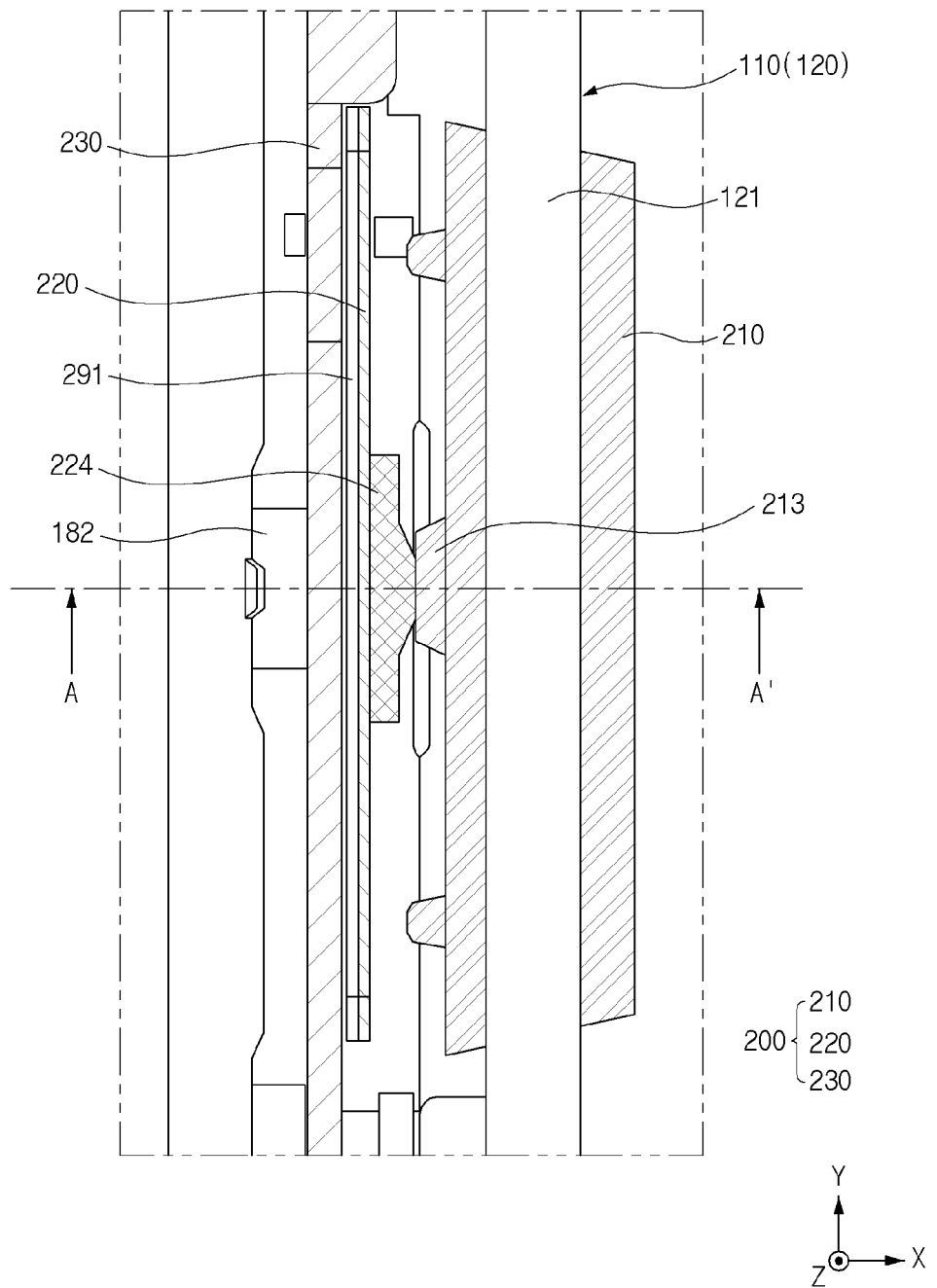
FIG. 10 is a side view illustrating a state in which the key assembly of the electronic device is coupled to the housing according to an embodiment.
Figure 11A:
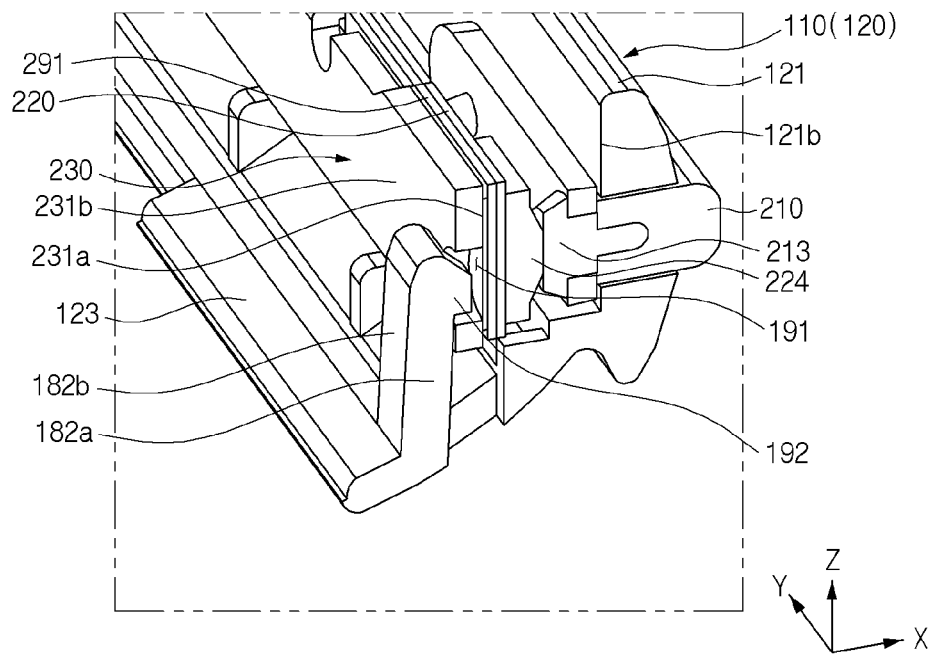
FIG. 11A is a perspective view illustrating a coupling structure of the housing and the key assembly of the electronic device according to an embodiment.
Figure 11B:
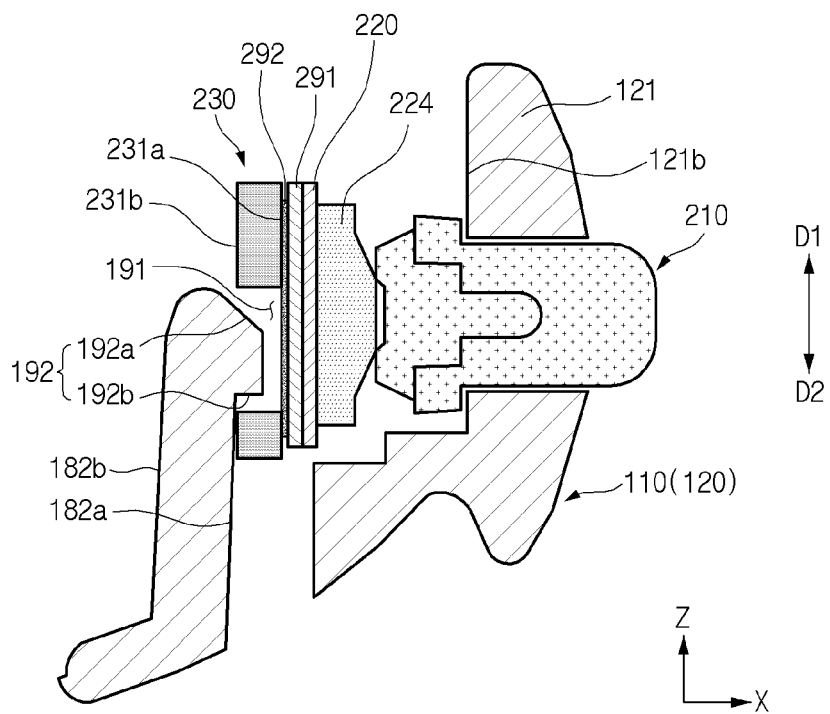
FIG. 11B is a side view illustrating the coupling structure of the housing and the key assembly of the electronic device according to an embodiment.

FIG. 10 is a side view illustrating a state in which the key assembly of the electronic device is coupled to the housing according to an embodiment. FIGS. 11A and 11B (hereinafter, referred to as FIG. 11) are perspective views illustrating a coupling structure of the housing and the key assembly of the electronic device according to an embodiment.

FIG. 10 illustrates a plan view of the electronic device as viewed from above based on FIG. 6. FIG. 11 illustrates sectional views taken along line A-A' of FIG. 10.

Referring to FIGS. 10 and 11, the electronic device according to an embodiment (e.g., the electronic device 100 of FIGS. 1 to 6) may include the housing (e.g., the housing 110 of FIGS. 1 to 3) and the key assembly 200, and the key assembly 200 may include the side key 210, the key circuit board 220, and the key bracket 230. The housing 110 illustrated in FIGS. 10 and 11 may be referred to as the first support member (e.g., the first support member 120 of FIGS. 1 to 9).

FIGS. 10 and 11 illustrate a fixing structure (or, a locking structure) between the key bracket 230 and the second support part 182 (e.g., the first structure 182-1 of FIGS. 5 and 6) corresponding to the first side key (e.g., the first side key 210-1 of FIGS. 4 to 6) among the plurality of second support parts 182 (e.g., the plurality of second support parts 182 of FIGS. 5 and 6). However, without being limited thereto, the fixing structure (or, the locking structure) illustrated in FIGS. 10 and 11 may also be applied between the key bracket 230 and the second support part 182 (e.g., the second structure 182-2 or the third structure 182-3 of FIGS. 5 and 6) corresponding to the second side key (e.g., the second side key 210-2 of FIGS. 4 to 6).

According to an embodiment, the electronic device 100 may include the fixing structure (or, the locking structure) for fixing the key bracket 230 to the first support member 120. The fixing structure of the key bracket 230 may include the first locking protrusion 192 and the locking hole 191. The first locking protrusion 192 may be disposed on the second support part 182 of the first support member 120, and the locking hole 191 may be disposed in the key bracket 230.

In an embodiment, the first support member 120 may include the sidewall 121 having the key-hole 124 formed therein and the edge 123 obliquely extending from the sidewall 121 in a lower direction (e.g., a second direction D2). The second support part 182 may protrude from the edge 123 of the first support member 120. The second support part 182 may extend from the edge 123 to face the sidewall 121. The second support part 182 may include a first surface 182a facing the sidewall 121 and a second surface 182b facing away from the first surface 182a. The first locking protrusion 192 may protrude from the first surface 182a of the second support part 182. The first locking protrusion 192 may protrude from a partial area of the first surface 182a of the second support part 182 toward the sidewall 121.

In an embodiment, at least a portion of the side key 210 may be inserted into the key-hole 124. The side key 210 may contact the switch 224 disposed on the key circuit board 220. In response to a click operation of the user, the side key 210 may move inside the key-hole 124 in a direction toward or away from the second support part 182. The side key 210 may press the switch 224 by moving toward the second support part 182 in response to the click operation of the user.

In an embodiment, the key circuit board 220 may be disposed on the key bracket 230. For example, the key circuit board 220 may be attached to the key bracket 230 through an adhesive tape 292. A reinforcing plate 291 may be disposed between the key circuit board 220 and the adhesive tape 292. According to various embodiments of the disclosure, the key circuit board 220 and the reinforcing plate 291 may be integrally formed with each other and may be implemented as one part.

In an embodiment, the key bracket 230 having the key circuit board 220 disposed thereon may be coupled to the first support member 120 in a vertical direction (e.g., the −z-axis direction). For example, the key bracket 230 may be assembled to the first support member 120 in the second direction D2 after the side key 210 is inserted into the key-hole 124. As the key bracket 230 is assembled in the second direction D2, the switch 224 may be deformed into a state in which at least a portion thereof is pressed by the pressure protrusion 213 of the side key 210. The key bracket 230 may include the first surface 231a facing the sidewall 121 and the second surface 231b facing the second support part 182. The key circuit board 220 and the reinforcing plate 291 may be attached to the first surface 231a of the key bracket 230. The second surface 231b of the key bracket 230 may be supported by at least a portion of the second support part 182. For example, when the side key 210 presses the switch 224, the second support part 182 may support the key bracket 230 such that the key bracket 230 does not move in the pressing direction of the switch 224 or a portion of the key bracket 230 is not bent.

In an embodiment, the key bracket 230 may include the locking hole 191 into which the first locking protrusion 192 of the second support part 182 is inserted. The locking hole 191 may penetrate the first surface 231a and the second surface 231b of the key bracket 230. When the key bracket 230 is coupled to the first support member 120, at least a portion of the first locking protrusion 192 may be inserted into the locking hole 191. As the first locking protrusion 192 is inserted into the locking hole 191, the locking structure may be provided between the key bracket 230 and the second support part 182. Movement of the key bracket 230 in a first direction D1 (e.g., the +z-axis direction) may be limited by the first locking protrusion 192. Accordingly, the key bracket 230 may be stably fixed so as not to be separated from the first support member 120 and may prevent a phenomenon in which the feeling of clicking the side key 210 is deteriorated as the key bracket 230 is lifted from the first support member 120 in the first direction D1.

In an embodiment, the key bracket 230 may move along an inclined surface 192a formed on an upper side of the first locking protrusion 192 in a process of being assembled to the first support member 120 in the first direction. For example, the second support part 182 may be implemented with an elastic piece capable of elastic deformation. When the key bracket 230 is assembled, at least a portion of the second support part 182 may be elastically deformed in a direction (e.g., the −x-axis direction) away from the sidewall 121 such that the key bracket 230 moves in the second direction D2. When the key bracket 230 is coupled to the first support member 120, an inner wall of the locking hole 191 may face a perpendicular surface 192b of the first locking protrusion 192, and as the locking hole 191 and the perpendicular surface 192b of the first locking protrusion 192 are hooked together, movement of the key bracket 230 in the first direction D1 may be limited.

Figure 12:
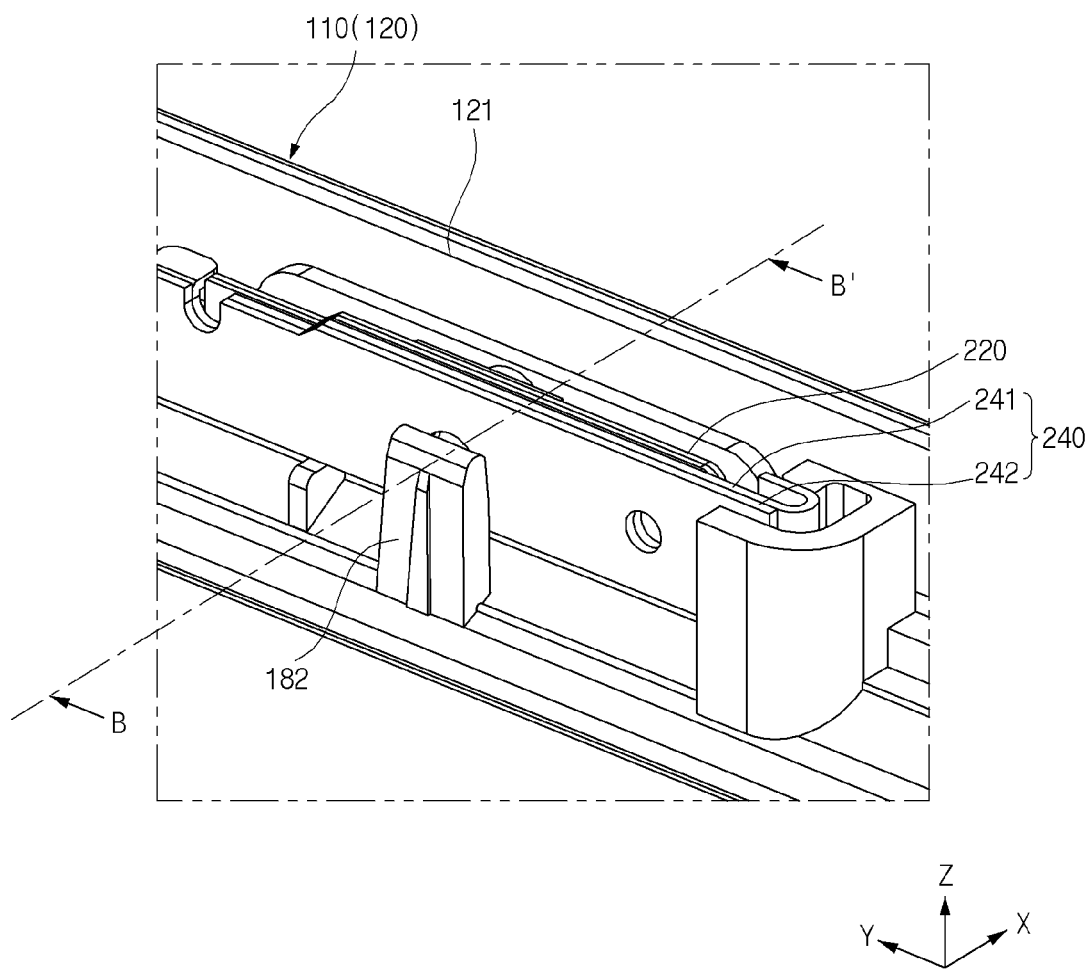
FIG. 12 is a perspective view illustrating a state in which a key assembly of the electronic device is coupled to the housing according to an embodiment.
Figure 13:
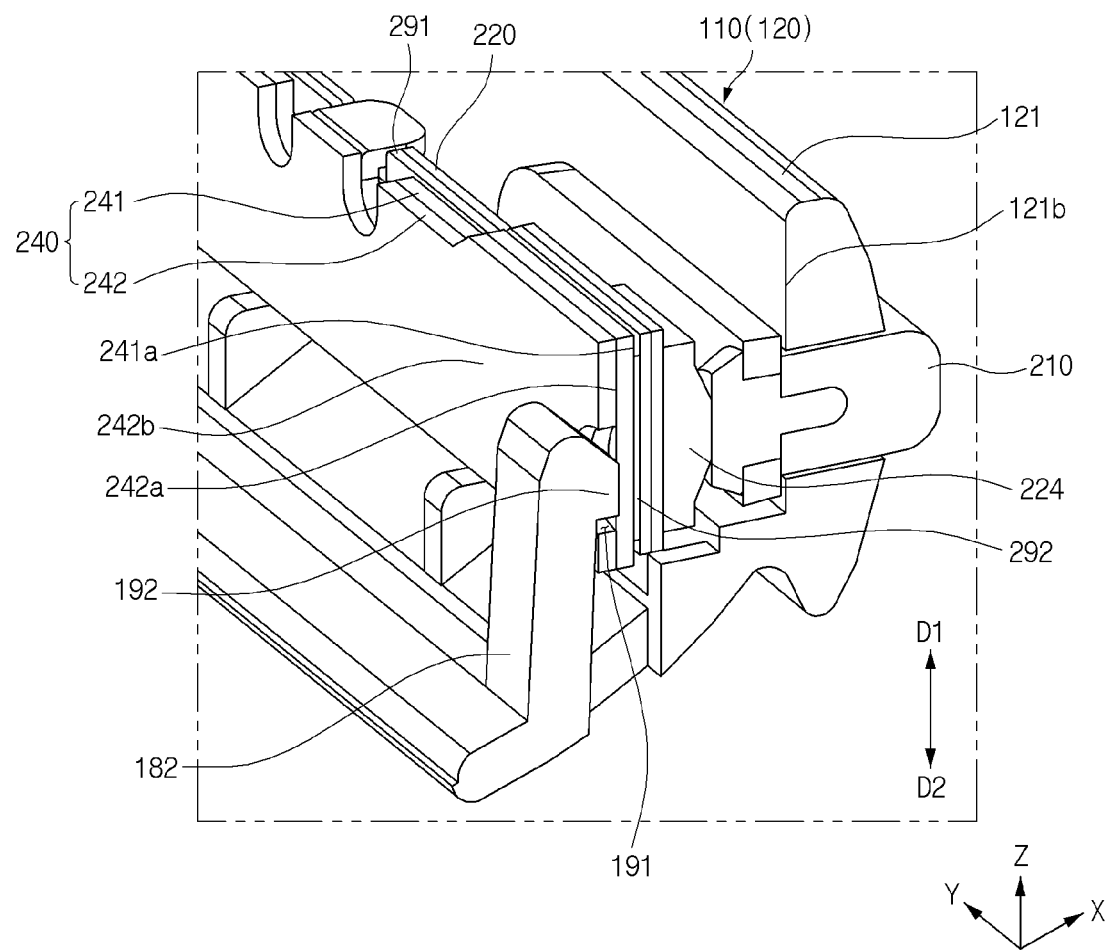
FIG. 13 is a perspective view illustrating a coupling structure of the housing and the key assembly of the electronic device according to an embodiment.

FIG. 12 is a perspective view illustrating a state in which a key assembly of the electronic device is coupled to the housing according to an embodiment. FIG. 13 is a perspective view illustrating a coupling structure of the housing and the key assembly of the electronic device according to an embodiment.

FIG. 13 illustrates a sectional view taken along line B-B' of FIG. 12.

Referring to FIGS. 12 and 13, the electronic device according to an embodiment (e.g., the electronic device 100 of FIGS. 1 to 6) may include the housing (e.g., the housing 110 of FIGS. 1 to 3), the side key 210, the key circuit board 220, and a key bracket 240 (e.g., the key bracket 230 of FIGS. 4 to 11), and the key bracket 240 may include a first bracket 241 and a second bracket 242. The housing 110 illustrated in FIGS. 12 and 13 may be referred to as the first support member (e.g., the first support member 120 of FIGS. 1 to 9).

FIGS. 12 and 13 illustrate another embodiment in which the key bracket 240 includes the first bracket 241 and the second bracket 242 when compared to the embodiment of FIGS. 10 and 11. Therefore, repetitive descriptions will hereinafter be omitted, and the following description will be focused on the difference.

In an embodiment, the key bracket 240 may include the first bracket 241 on which the key circuit board 220 is disposed and the second bracket 242 in which the locking hole 191 is formed. The first bracket 241 and the second bracket 242 may be disposed to face each other. The first bracket 241 and the second bracket 242 may be formed as separate parts and may be coupled (or, attached) to each other. However, the disclosure is not limited thereto, and according to various embodiments of the disclosure, the first bracket 241 and the second bracket 242 may be integrally formed with each other. For example, the key bracket 240 may be provided as one part and may be configured such that a locking groove (not illustrated) is concavely formed on a portion of the key bracket 240 to a specified depth without the locking hole 191 in the key bracket 240.

In an embodiment, the first bracket 241 may include a first surface 241a (e.g., a surface facing in the +x-axis direction) that faces the sidewall 121 of the first support member 120 and a second surface (not illustrated) (e.g., a surface facing in the −x-axis direction) that faces away from the first surface 241b. The key circuit board 220 and the reinforcing plate 291 may be disposed on the first surface 241a of the first bracket 241. For example, the key circuit board 220 and the reinforcing plate 291 may be attached to the first surface 241a of the first bracket 241 through the adhesive tape 292. The second surface of the first bracket 241 may face the second bracket 242.

In an embodiment, the second bracket 242 may include a third surface 242a (e.g., a surface facing in the +x-axis direction) that faces the second surface (not illustrated) of the first bracket 241 and a fourth surface 242b (e.g., a surface facing in the −x-axis direction) that faces away from the third surface 242a. The fourth surface 242b of the second bracket 242 may face a portion of the second support part 182. The key bracket 240, when pressed depending on a click operation of the side key 210, may be supported by the second support part 182 as the fourth surface 242b of the second bracket 242 makes contact with a portion of the second support part 182. The second bracket 242 may include the locking hole 191 penetrating at least portions of the third surface 242a and the fourth surface 242b in a direction perpendicular thereto. At least a portion of the first locking protrusion 192 may be inserted into the locking hole 191.

The key assembly 200 according to an embodiment may be configured such that the key bracket 240 includes the first bracket 241 supporting the key circuit board 220 and the second bracket 242 having the locking hole 191 formed therein as separate parts. Accordingly, deformation of the key bracket 240 may be prevented. Furthermore, the first bracket 241 may be disposed between the first locking protrusion 192 and the key circuit board 220 (or, the reinforcing plate 291). Accordingly, the key circuit board 220 (or, the reinforcing plate 291) may be prevented from being dented or damaged by the first locking protrusion 192. In addition, the first bracket 241 may be disposed between the locking hole 191 and the area of the key circuit board 220 on which the switch 224 is disposed. Accordingly, the switch 224 and the key circuit board 220 may be stably supported by the first bracket 241 when the switch 224 is pressed by the side key 210.

Figure 14:
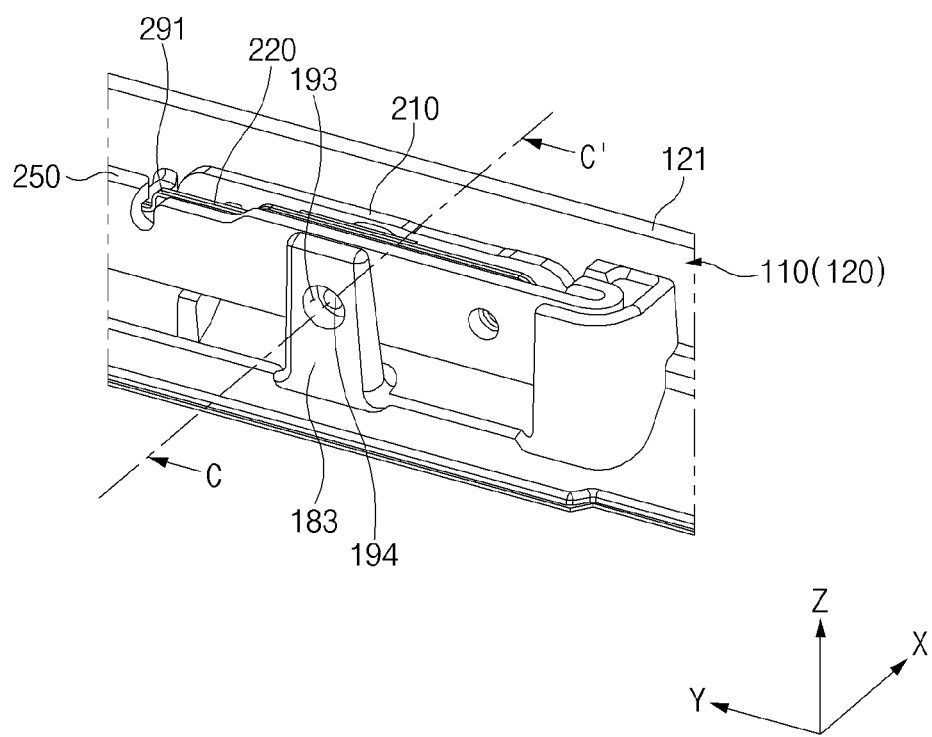
FIG. 14 is a perspective view illustrating a state in which a key assembly of the electronic device is coupled to the housing according to an embodiment.
Figure 15:
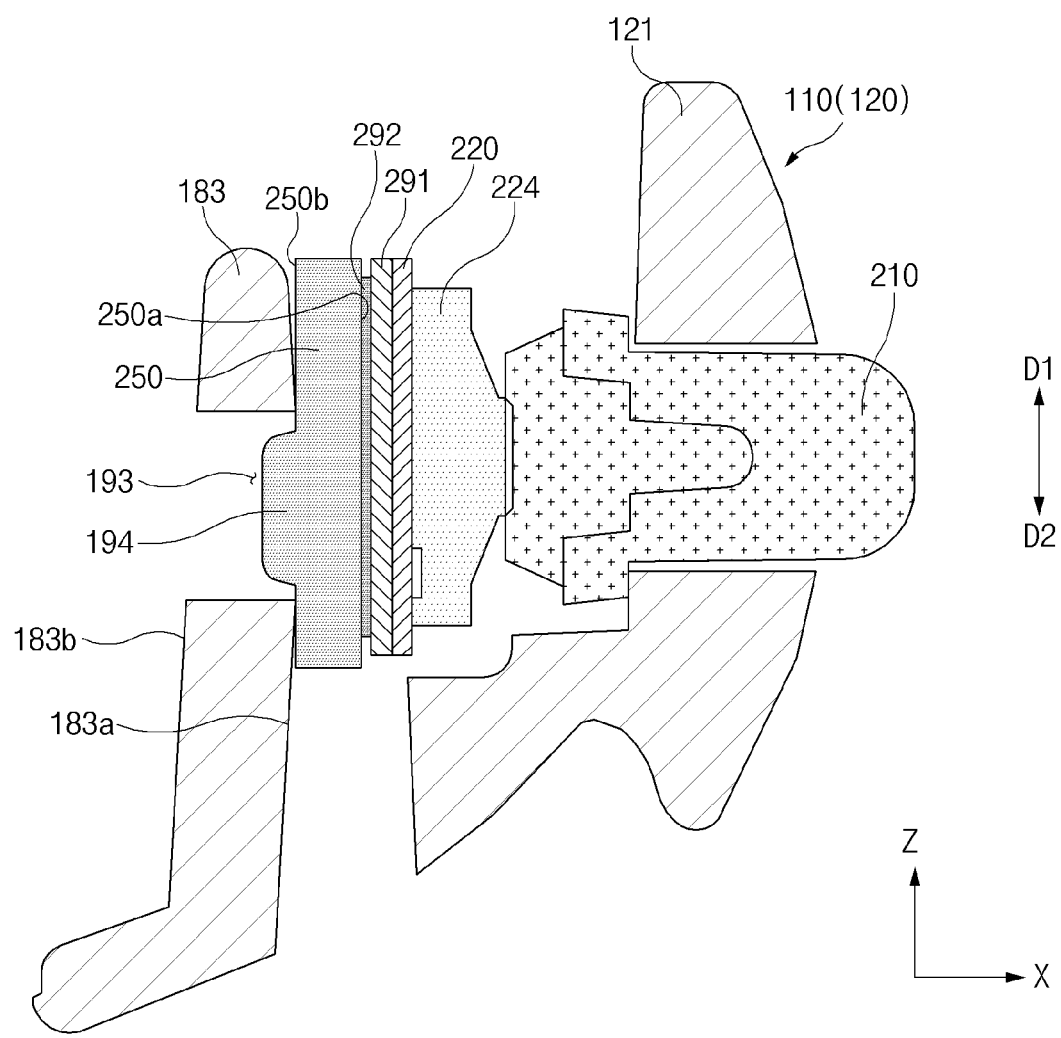
FIG. 15 is a side view illustrating a coupling structure of the housing and the key assembly of the electronic device according to an embodiment.

FIG. 14 is a perspective view illustrating a state in which a key assembly of the electronic device is coupled to the housing according to an embodiment. FIG. 15 is a side view illustrating a coupling structure of the housing and the key assembly of the electronic device according to an embodiment.

FIG. 15 illustrates a sectional view taken along line C-C' of FIG. 14.

Referring to FIGS. 14 and 15, the electronic device according to an embodiment (e.g., the electronic device 100 of FIGS. 1 to 6) may include the housing (e.g., the housing 110 of FIGS. 1 to 3), the side key 210, the key circuit board 220, and a key bracket 250 (e.g., the key bracket 230 of FIGS. 4 to 11 or the key bracket 240 of FIGS. 12 and 13). The housing 110 illustrated in FIGS. 14 and 15 may be referred to as the first support member (e.g., the first support member 120 of FIGS. 1 to 9).

FIGS. 14 and 15 illustrate an embodiment in which a first locking protrusion 194 (e.g., the first locking protrusion 192 of FIG. 11) is disposed on the key bracket 250 (e.g., the key bracket 230 of FIGS. 10 and 11) and a locking hole 193 (e.g., the locking hole 191 of FIG. 11) is disposed in the first support member 120, when compared to the embodiment of FIGS. 10 and 11. Therefore, repetitive descriptions will hereinafter be omitted, and the following description will be focused on the difference.

In an embodiment, the electronic device 100 may include a fixing structure (or, a locking structure) between the key bracket 250 and a second support part 183. The fixing structure of the key bracket 250 may include the first locking protrusion 194 and the locking hole 193. The first locking protrusion 194 may be disposed on the key bracket 250, and the locking hole 193 may be disposed in the second support part 183 of the first support member 120. Unlike in the embodiment illustrated in FIGS. 10 and 11 in which the fixing structure is formed by the locking hole 191 disposed in the key bracket 230 and the first locking protrusion 192 disposed on the second support part 182, the electronic device 100 illustrated in FIGS. 14 and 15 may include the fixing structure formed by the first locking protrusion 194 disposed on the key bracket 250 and the locking hole 193 disposed in the second support part 183.

In an embodiment, the first support member 120 may include the second support part 183 facing the sidewall 121. The locking hole 193 may be formed in the second support part 183 of the first support member 120. The locking hole 193 may penetrate partial areas of a first surface 183a and a second surface 183b of the second support part 183 in a direction perpendicular thereto (e.g., the x-axis direction). For example, the locking hole 193 may be formed in a shape and/or size corresponding to the first locking protrusion 194 such that at least a portion of the first locking protrusion 194 is inserted into the locking hole 193. According to the illustrated embodiment, the locking hole 193 may be formed in a circular shape. However, the shape of the locking hole 193 is not limited to the illustrated embodiment, and according to various embodiments of the disclosure, the locking hole 193 may be formed in an oval or polygonal shape within a range in which the first locking protrusion 194 is able to be inserted into the locking hole 193.

In an embodiment, the first locking protrusion 194 may be formed on the key bracket 250. The key bracket 250 may include a first surface 250a on which the key circuit board 220 (or, the reinforcing plate 291) is disposed and a second surface 250b that faces away from the first surface 250a and makes contact with the second support part 183. The first locking protrusion 194 may extend from a partial area of the second surface 250b of the key bracket 250 toward the second support part 183. For example, the first locking protrusion 194 may protrude from the second surface 250b of the key bracket 250 by a specified height.

In an embodiment, when the key bracket 250 is coupled (or, assembled) to the first support member 120 in the second direction D2, at least a portion of the first locking protrusion 194 may be inserted into the locking hole 193. As in the embodiments of FIGS. 10 to 13, the fixing structure (or, the locking structure) may be provided between the key bracket 250 and the second support part 183 as the first locking protrusion 194 is inserted into the locking hole 193. Movement of the key bracket 250 in the first direction D1 may be limited by the first locking protrusion 194. An upper end portion (e.g., an end portion facing in the first direction D1) of the second support part 183 and/or corner portions of the first locking protrusion 194 may have a rounded shape such that the first locking protrusion 194 moves in the second direction D2 along the second support part 183 when the key bracket 250 is coupled to the first support member 120.

According to the illustrated embodiment, the second support part 183 may have the locking hole 193 into which the first locking protrusion 194 is inserted. However, the disclosure is not necessarily limited to the illustrated embodiment, and a locking groove (not illustrated) instead of the locking hole 193 may be formed on the second support part 183. For example, unlike the locking hole 193 completely penetrating the first surface 183a and the second surface 183b of the second support part 183, the locking groove may be concavely formed on a partial area of the first surface 183a to a specified depth in a direction (e.g., the -x-axis direction) toward the second surface 183b.

Figure 16A:
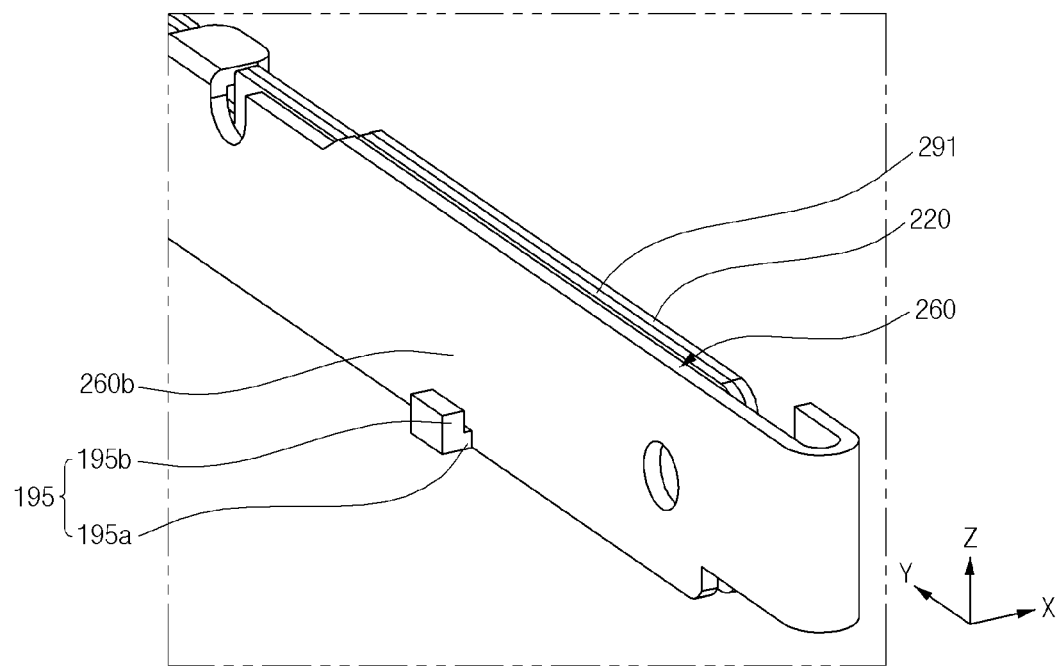
FIG. 16A is a perspective view illustrating a coupling structure of the housing and a key assembly of the electronic device according to an embodiment.
Figure 16B:
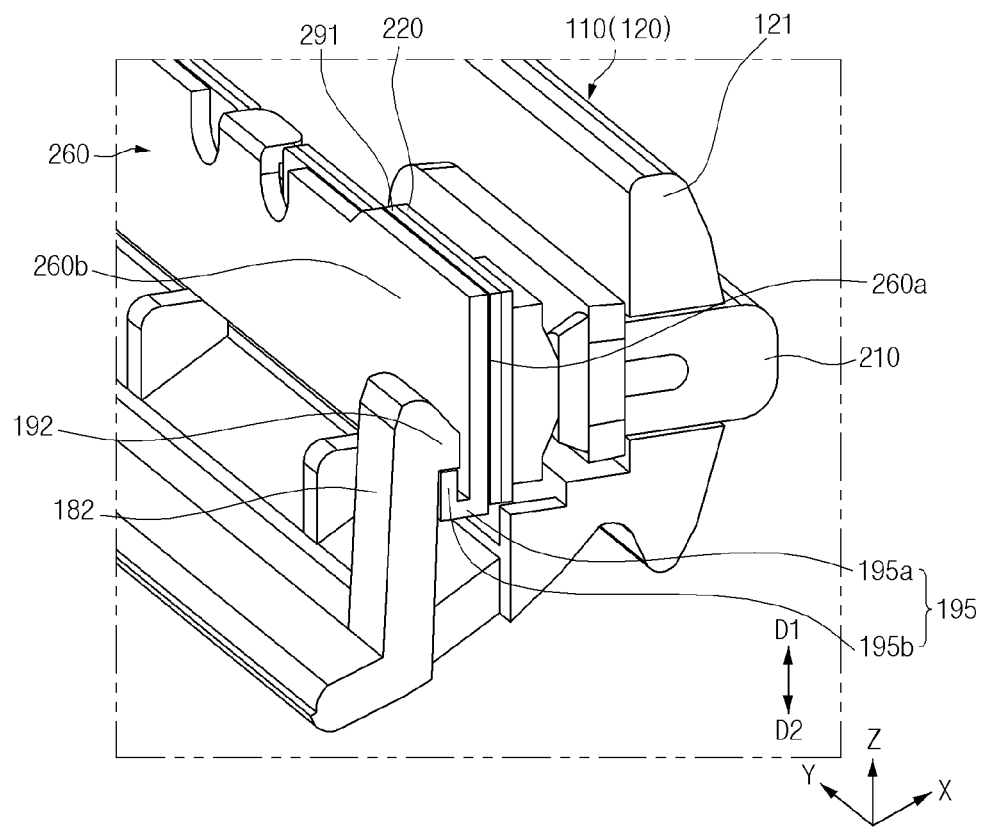
FIG. 16B is a perspective view illustrating the coupling structure of the housing and the key assembly of the electronic device according to an embodiment.

FIGS. 16A and 16B (hereinafter, referred to as FIG. 16) are views illustrating a coupling structure of the housing and a key assembly of the electronic device according to an embodiment.

FIG. 16A is a perspective view of a portion of a key bracket. FIG. 16B is a sectional view illustrating a coupling structure of the rear case and the key assembly.

Referring to FIG. 16, the electronic device according to an embodiment (e.g., the electronic device 100 of FIGS. 1 to 6) may include the housing (e.g., the housing 110 of FIGS. 1 to 3), the side key 210, the key circuit board 220, and the key bracket 260 (e.g., the key bracket 230 of FIGS. 4 to 11, the key bracket 240 of FIGS. 12 and 13, or the key bracket 250 of FIGS. 14 and 15). The housing 110 illustrated in FIG. 16 may be referred to as the first support member (e.g., the first support member 120 of FIGS. 1 to 9).

In an embodiment, the electronic device 100 may include a fixing structure (or, a locking structure) for fixing the key bracket 260. The fixing structure of the key bracket 260 may include a first locking protrusion 194 and a locking jaw 195. The first locking protrusion 194 may be disposed on the second support part 183 of the first support member 120, and the locking jaw 195 may be disposed on the key bracket 260. FIG. 16 illustrates an embodiment in which the fixing structure (or, the locking structure) of the key bracket 260 is formed by the first locking protrusion 192 disposed on the second support part 182 and the locking jaw 195 disposed on the key bracket 260, when compared to the embodiment of FIGS. 10 and 11. Therefore, repetitive descriptions will hereinafter be omitted, and the following description will be focused on the difference.

In an embodiment, the first support member 120 may include the second support part 182 facing the sidewall 121. The first locking protrusion 192 may be disposed on the second support part 182 of the first support member 120. For example, the second support part 182 may include the first surface 182a facing the sidewall 121 and the second surface 182b facing away from the first surface 182a, and the first locking protrusion 192 may be formed on the first surface 182a of the second support part 182. For example, the first locking protrusion 192 may protrude from a partial area of the first surface 182a of the second support part 182 toward the key bracket 260.

In an embodiment, the key bracket 260 may include the locking jaw 195. The locking jaw 195 may be engaged with the first locking protrusion 192 in an up/down direction (e.g., the z-axis direction). The first locking protrusion 192 and the locking jaw 195 engaged with each other may fix the key bracket 260 to the first support member 120 such that the key bracket 260 is not separated in the first direction D1. The locking jaw 195 may protrude from at least a portion of the key bracket 260 toward the second support part 182 so as to be engaged with the first locking protrusion 192. The key bracket 260 may include a first surface 260a on which the key circuit board 220 (or, the reinforcing plate 291) is disposed and a second surface 260b that faces away from the first surface 260a, and the locking jaw 195 may be disposed on the second surface 260b of the key bracket 260. For example, the locking jaw 195 may protrude from a partial area of the second surface 260b of the key bracket 260 toward the second support part 182 (or, the first locking protrusion 192).

In an embodiment, the locking jaw 195 may include a first part 195a extending from the second surface 260b of the key bracket 260 and a second part 195b extending from the first part 195a. The first part 195a may extend from a partial area of the second surface 260b of the key bracket 260 in a direction (e.g., the −x-axis direction) perpendicular to the second surface 260b. The second part 195b may extend from the first part 195a in a direction (e.g., the +z-axis direction or the first direction D1) substantially perpendicular to the first part 195a. The second part 195b may be spaced apart from the second surface 260b of the key bracket 260 by a predetermined gap.

In an embodiment, when the key bracket 260 is coupled to the first support member 120, the first locking protrusion 192 and the locking jaw 195 may be engaged with each other. Accordingly, the fixing structure (or, the locking structure) may be provided between the key bracket 260 and the second support part 182. The locking jaw 195 may be located in the lower direction (e.g., the second direction D2) from the first locking protrusion 192, and the second part 195b of the locking jaw 195 may contact the perpendicular surface of the first locking protrusion 192. For example, since the first locking protrusion 192 is located in the first direction D1 with respect to the locking jaw 195, movement or separation of the key bracket 260 in the first direction D1 may be limited.

According to the illustrated embodiment, the locking jaw 195 may include the first part 195a and the second part 195b perpendicular to each other. However, this is illustrative, and the shape of the locking jaw 195 is not limited to the illustrated embodiment. According to various embodiments of the disclosure, the locking jaw 195 may not include the second part 195b. For example, the locking jaw 195 may include only the first part 195a protruding from the second surface 260b of the key bracket 260, and the first part 195a may have a predetermined thickness. In this case, the first part 195a may contact the first locking protrusion 192 and may prevent separation of the key bracket 260.

Figure 17A:
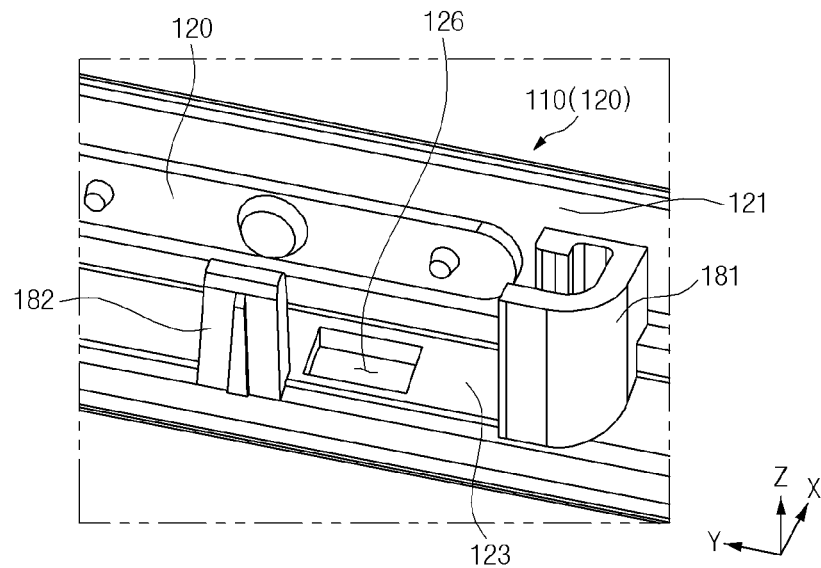
FIG. 17A is a perspective view illustrating a coupling structure of the housing and a key assembly of the electronic device according to an embodiment.
Figure 17B:
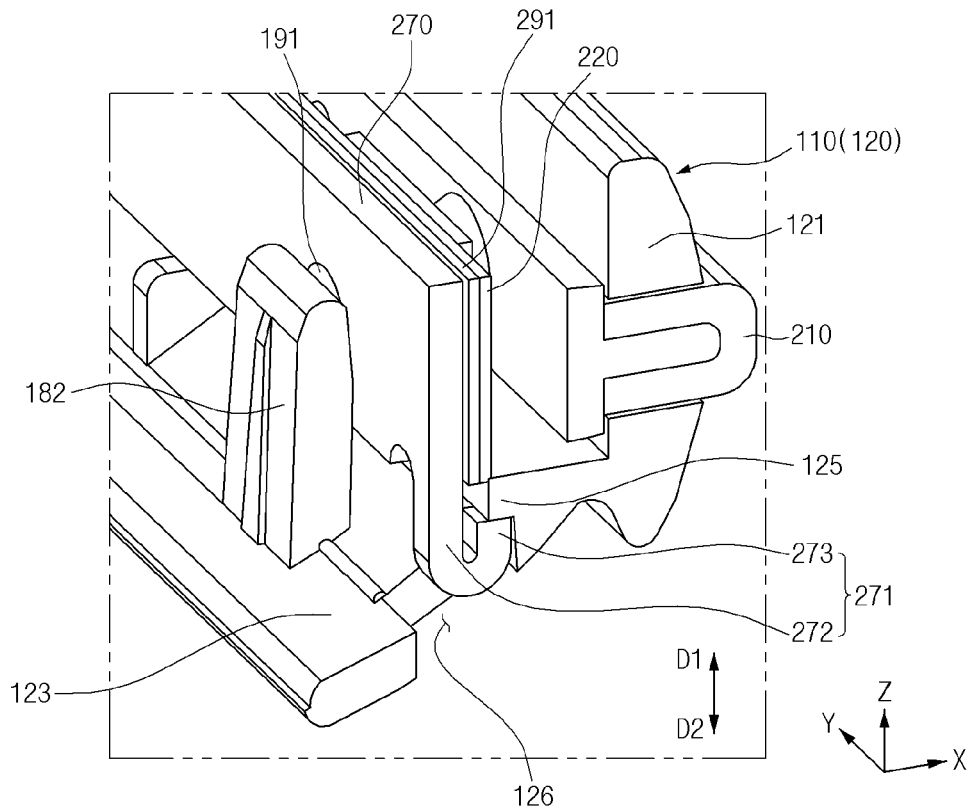
FIG. 17B is a perspective view illustrating the coupling structure of the housing and the key assembly of the electronic device according to an embodiment.

FIGS. 17A and 17B (hereinafter, referred to as FIG. 17) are views illustrating a coupling structure of the housing and a key assembly of the electronic device according to an embodiment.

FIG. 17A is a perspective view of a portion of the rear case. FIG. 17B is a sectional view illustrating a coupling structure of the rear case and the key assembly.

Referring to FIG. 17, the electronic device according to an embodiment (e.g., the electronic device 100 of FIGS. 1 to 6) may include the housing (e.g., the housing 110 of FIGS. 1 to 3), the side key 210, the key circuit board 220, and a key bracket 270 (e.g., the key bracket 230 of FIGS. 4 to 11, the key bracket 240 of FIGS. 12 and 13, the key bracket 250 of FIGS. 14 and 15, or the key bracket 260 of FIG. 16). The housing 110 illustrated in FIG. 17 may be referred to as the first support member (e.g., the first support member 120 of FIGS. 1 to 9).

In an embodiment, the electronic device 100 may include a fixing structure (or, a locking structure) for fixing the key bracket 270. The fixing structure of the key bracket 270 may include a first extension 271 and a step 125. FIG. 17 illustrates an embodiment in which the key bracket 270 includes the first extension 271 when compared to the embodiment of FIGS. 10 and 11. Therefore, repetitive descriptions will hereinafter be omitted, and the following description will be focused on the difference.

In an embodiment, the first support member 120 may include an opening 126 in which at least a portion of the first extension 271 of the key bracket 270 is disposed. The opening 126 may penetrate at least a partial area of the edge 123 of the first support member 120 in the up/down direction (e.g., the z-axis direction). The opening 126 may be located between the first support part 181 and the second support part 182. However, this is illustrative, and the position of the opening 126 is not limited to the illustrated embodiment. At least a portion of the first extension 271 may be disposed in the opening 126. The opening 126 may be formed in a shape corresponding to at least a portion of the first extension 271. According to the illustrated embodiment, the opening 126 may be formed in a quadrangular shape. However, the shape of the opening 126 is not limited to the illustrated embodiment, and according to various embodiments of the disclosure, the opening 126 may be formed in a circular, oval, or polygonal shape.

In an embodiment, the first support member 120 may include the step 125 extending from an inner wall of the opening 126. The step 125 may protrude from the inner wall of the opening 126 toward the second support part 182. For example, the step 125 may be substantially perpendicular to the sidewall 121 of the first support member 120. The step 125 may contact at least a portion of the first extension 271. For example, when the key bracket 270 is coupled to the first support member 120, the first extension 271 may be engaged with the step 125 in the up/down direction (e.g., the z-axis direction) in a state in which at least a portion of the first extension 271 is disposed in the opening 126.

In an embodiment, the key bracket 270 may include the first extension 271. The first extension 271 may form the fixing structure between the key bracket 270 and the first support member 120 by making contact with the step 125 of the first support member 120. The first extension 271 may extend from at least a portion of the key bracket 270 (e.g., the base part 231 of FIG. 7) in a width direction of the key bracket 270 (e.g., the z-axis direction). For example, the first extension 271 may extend from a base part of the key bracket 270 in the second direction D2. The first extension 271 may extend in a direction perpendicular to the direction in which a first end portion (e.g., the first end portion 232-1 of FIG. 7) and/or a second end portion (e.g., the second end portion 232-2 of FIG. 7) of the key bracket 270 extends.

In an embodiment, the first extension 271 may be formed such that at least a portion thereof has a bent shape. The first extension 271 may include a first part 272 extending from the base part (e.g., the base part 231 of FIG. 7) and a second part 273 bent from the first part 272 toward the sidewall 121. The first extension 271 may be formed in a bent shape such that the second part 273 faces at least a portion of the first part 272. For example, the first part 272 may extend from the base part 231 in the second direction D2. The second part 273 may extend from the first part 272 in the first direction D1. The first extension 271 may be formed in the shape of "U" or "⊂". The first extension 271 may be elastically deformable such that the first part 272 and the second part 273 move toward or away from each other.

In an embodiment, when the key bracket 270 is coupled to the first support member 120, at least a portion of the first extension 271 may be disposed in the opening 126, and the second part 273 of the first extension 271 may contact the step 125. As the first extension 271 and the step 125 are engaged with each other as described above, the fixing structure may be provided between the key bracket 270 and the second support part 182. The second part 273 of the first extension 271 may be located in the lower direction (e.g., the second direction D2) from the step 125, and the first extension 271 may be stopped by the step 125. For example, movement or separation of the key bracket 270 in the first direction D1 may be limited since the step 125 is located in the first direction D1 with respect to the second part 273 of the first extension 271.

According to the illustrated embodiment, the fixing structure (or, the locking structure) of the key bracket 270 may be formed by the first extension 271 of the key bracket 270 and the step 125 of the first support member 120. The fixing structure illustrated in FIG. 17 may be implemented together with the fixing structure (or, the locking structure) described above with reference to FIGS. 10 to 16. For example, the electronic device 100 may include only one of the fixing structure (e.g., the fixing structure of FIGS. 10 to 15) formed by the first locking protrusion (e.g., the first locking protrusion 192 of FIGS. 11 and 13 or the first locking protrusion 194 of FIGS. 14 and 15) and the locking hole (e.g., the locking hole 192 of FIGS. 11 and 13 or the locking hole 193 of FIGS. 14 and 15) and the fixing structure formed by the first extension 271 and the step 125, or may include both the fixing structures. Furthermore, the electronic device 100 may include only one of the fixing structure (e.g., the fixing structure of FIG. 16) formed by the first locking protrusion (e.g., the first locking protrusion 192 of FIG. 16) and the locking jaw (e.g., the locking jaw 195 of FIG. 16) and the fixing structure formed by the first extension 271 and the step 125, or may include both the fixing structures.

Figure 18A:
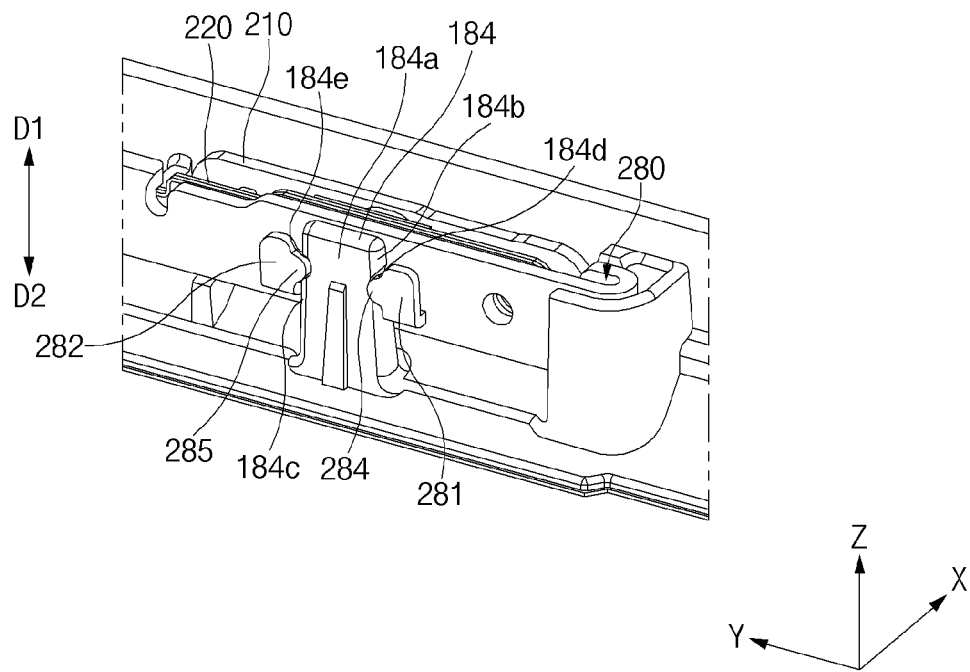
FIG. 18A is a perspective view illustrating a coupling structure of the housing and a key assembly of the electronic device according to an embodiment.
Figure 18B:
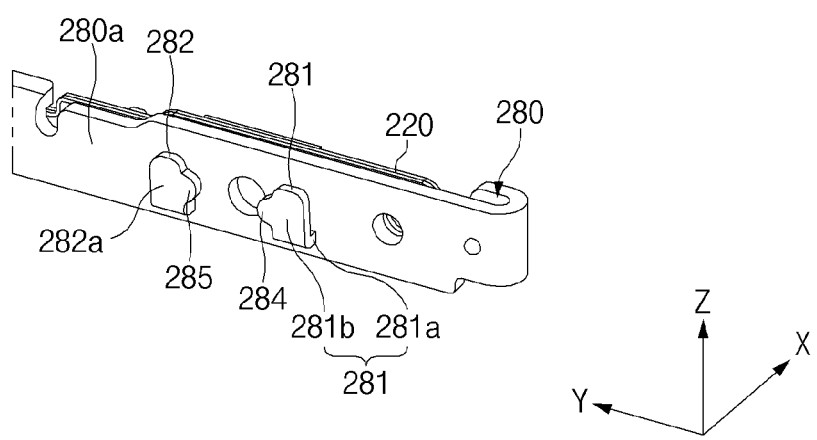
FIG. 18B is a perspective view illustrating the coupling structure of the housing and the key assembly of the electronic device according to an embodiment.

FIGS. 18A and 18B (hereinafter, referred to as FIG. 18) are views illustrating a coupling structure of the housing and a key assembly of the electronic device according to an embodiment.

FIG. 18A is a perspective view illustrating a state in which the rear case and the key assembly are coupled. FIG. 18B is a perspective view of a portion of a key bracket.

Referring to FIG. 18, the electronic device according to an embodiment (e.g., the electronic device 100 of FIGS. 1 to 6) may include the housing (e.g., the housing 110 of FIGS. 1 to 3), the side key 210, the key circuit board 220, and the key bracket 280 (e.g., the key bracket 230 of FIGS. 4 to 11, the key bracket 240 of FIGS. 12 and 13, the key bracket 250 of FIGS. 14 and 15, the key bracket 260 of FIG. 16, or the key bracket 270 of FIG. 17). The housing 110 illustrated in FIG. 18 may be referred to as the first support member (e.g., the first support member 120 of FIGS. 1 to 9). The components illustrated in FIG. 18 are identical or similar to some of the components of the electronic device 100 of FIGS. 1 to 11, and therefore repetitive descriptions will hereinafter be omitted.

In an embodiment, the electronic device 100 may include a fixing structure (or, a locking structure) for fixing the key bracket 280. The fixing structure of the key bracket 280 may include a pair of extensions (e.g., a second extension 281 and a third extension 282) and a pair of recesses (e.g., a first recess 184d and a second recess 184e). The second extension 281 and the third extension 282 may be disposed on the key bracket 280, and the first recess 184d and the second recess 184e may be disposed on a second support part 184 of the first support member 120.

In an embodiment, the first support member 120 may include the second support part 184 facing the key bracket 280. The recesses 184d and 184e may be formed on the second support part 184 of the first support member 120. The recesses 184d and 184e may be formed on opposite peripheral portions 184b and 184c of the second support part 184. At least partial areas of the peripheral portions 184b and 184c may be recessed to form the recesses 184d and 184e. For example, the second support part 184 may include the first peripheral portion 184b and the second peripheral portion 184c facing each other. The recesses 184d and 184e may include the first recess 184d formed on the first peripheral portion 184b of the second support part 184 and the second recess 184e formed on the second peripheral portion 184c of the second support part 184. The first recess 184d and the second recess 184e may be symmetrical to each other with respect to a second surface 184a of the second support part 184. Coupling protrusions 284 and 285 of the key bracket 280 may be coupled to the recesses 184d and 184e.

In an embodiment, the key bracket 280 may include the second extension 281 and the third extension 282 that are at least partially coupled to the recesses 184d and 184e of the second support part 184. The second extension 281 and the third extension 282 may protrude from a second surface 280a of the key bracket 280. The second extension 281 and the third extension 282 may be formed to be symmetrical to each other with the second support part 184 therebetween.

In an embodiment, the second extension 281 may include a first part 281a extending from the second surface 280a of the key bracket 280 and a second part 281b extending from the first part 281a. The second part 281b may extend from the first part 281a in a direction (e.g., the first direction D1) substantially perpendicular to the first part 281a. The third extension 282 may include a first part (not illustrated) that extends from the second surface 280a of the key bracket 280 and a second part 282a extending from the first part. The second part 282a may extend from the first part in a direction (e.g., the first direction D1) substantially perpendicular to the first part. The second extension 281 and the third extension 282 may be formed so as to be elastically deformable, and at least portions of the second extension 281 and the third extension 282 may move toward or away from each other.

In an embodiment, the first coupling protrusion 284 protruding toward the third extension 282 may be formed on the second part 281b of the second extension 281. The second coupling protrusion 285 protruding toward the second extension 281 may be formed on the second part 282a of the third extension 282. The first coupling protrusion 284 may be disposed in the first recess 184d, and the second coupling protrusion 285 may be disposed in the second recess 184e. For example, the key bracket 280 may be fixed to the first support member 120 as the coupling protrusions 284 and 285 are fitted into the recesses 184d and 184e.

In an embodiment, when the key bracket 280 moves in the second direction D2 in a process in which the key bracket 280 is coupled to the first support member 120, the coupling protrusions 284 and 285 may move in the second direction D2 along the peripheral portions 184b and 184c of the second support part 184. The gap between the second extension 281 and the third extension 282 may be at least partially widened as the coupling protrusions 284 and 285 move in contact with the second support part 184. When the key bracket 280 continues to move in the second direction D2, the coupling protrusions 284 and 285 may be locked while being inserted into the recesses 184d and 184e. For example, when the key bracket 280 is coupled to the first support member 120, the coupling protrusions 284 and 285 of the key bracket 280 may be locked to the recesses 184d and 184e of the second support part 184, and thus the fixing structure (or, the locking structure) may be provided between the key bracket 280 and the second support part 284.

According to the illustrated embodiment, the fixing structure (or, the locking structure) of the key bracket 280 may be formed by the extensions (the second extension 281 and the third extension 282) of the key bracket 280 and the recesses (the first recess 184d and the second recess 184e) of the first support member 120. The fixing structure illustrated in FIG. 18 may be implemented together with the fixing structure (or, the locking structure) described above with reference to FIGS. 10 to 17.

Figure 19A:
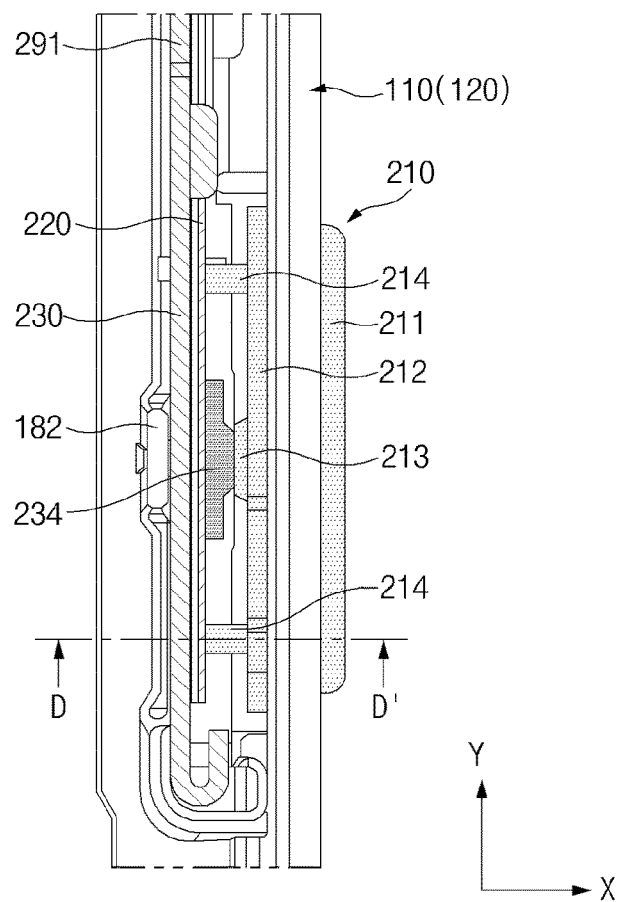
FIG. 19A is a side view illustrating a state in which a key assembly of the electronic device is coupled to the housing according to an embodiment.
Figure 19B:
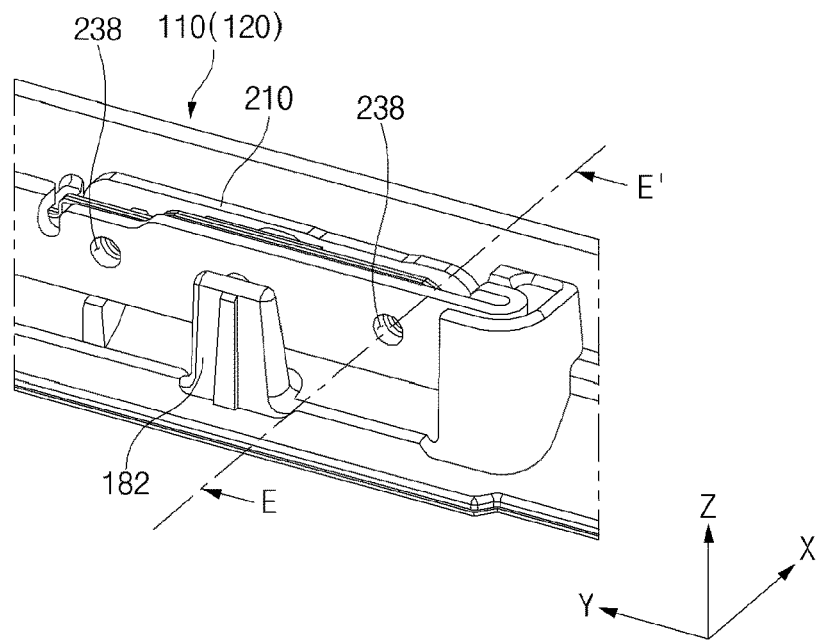
FIG. 19B is a perspective view illustrating the state in which the key assembly of the electronic device is coupled to the housing according to an embodiment.
Figure 20:
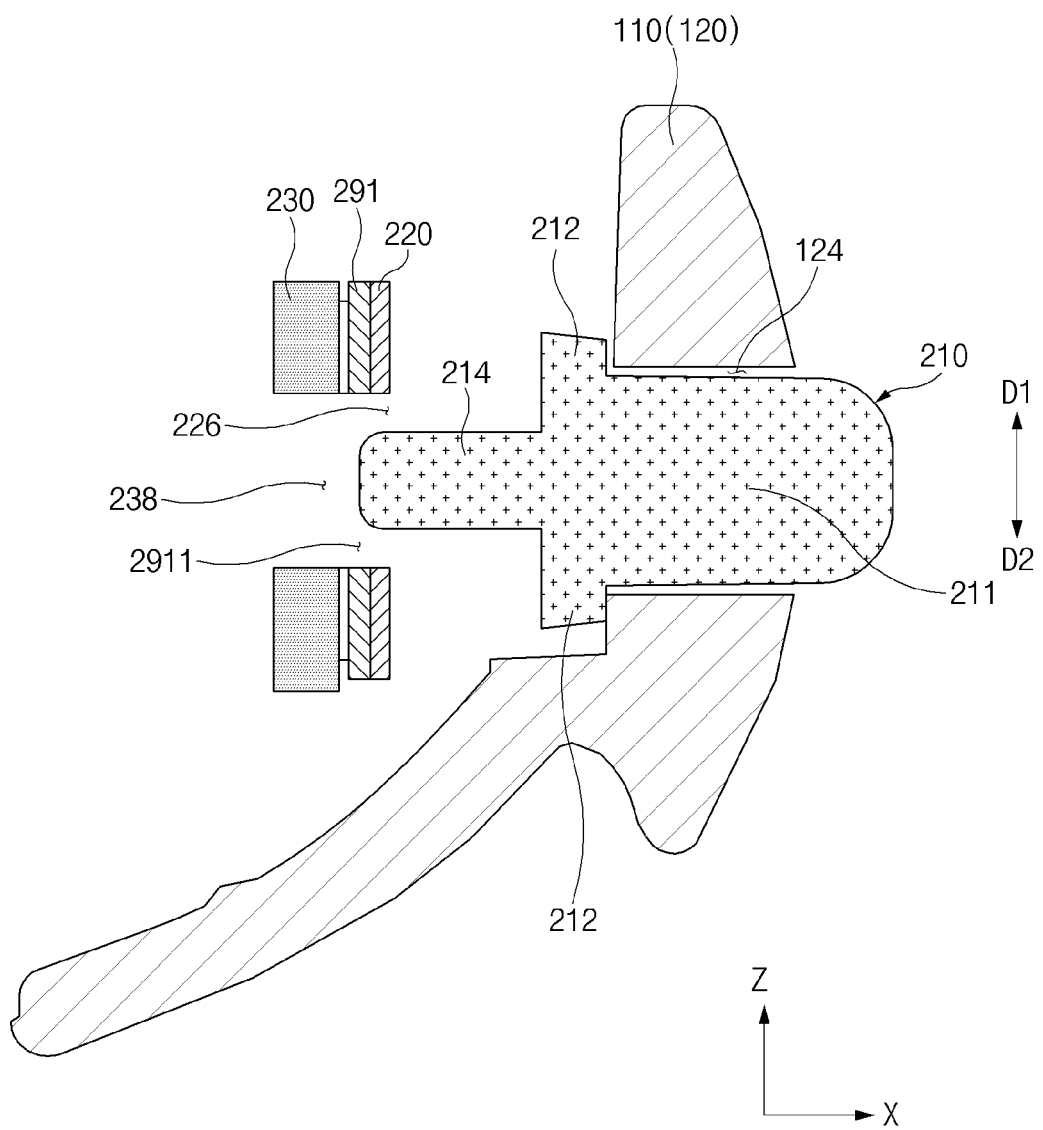
FIG. 20 is a side view illustrating a coupling structure of the housing and the key assembly of the electronic device according to an embodiment.

FIGS. 19A and 19B (hereinafter, referred to as FIG. 19) are views illustrating a state in which a key assembly of the electronic device is coupled to the housing according to an embodiment. FIG. 20 is a view illustrating a coupling structure of the housing and the key assembly of the electronic device according to an embodiment.

FIG. 19A is a plan view illustrating a state in which the rear case and the key assembly are coupled, and FIG. 19B is a perspective view illustrating the state in which the rear case and the key assembly are coupled. FIG. 20 illustrates a sectional view taken along line D-D' of FIG. 19A or a sectional view taken along line E-E' of FIG. 19B.

Referring to FIGS. 19 and 20, the electronic device according to an embodiment (e.g., the electronic device 100 of FIGS. 1 to 6) may include the housing (e.g., the housing 110 of FIGS. 1 to 3), the side key 210, the key circuit board 220, and the key bracket 230. The housing 110 illustrated in FIGS. 19 and 20 may be referred to as the first support member (e.g., the first support member 120 of FIGS. 1 to 9). The components illustrated in FIGS. 19 and 20 are identical or similar to some of the components of the electronic device 100 of FIGS. 1 to 11, and therefore repetitive descriptions will hereinafter be omitted.

In an embodiment, the side key 210 may include the body 211 and the flange 212 extending from the body 211 in the direction perpendicular thereto. When the side key 210 is coupled to the first support member 120, at least a portion of the body 211 may be inserted into the key-hole 124, and inside the first support member 120, the flange 212 may contact the inner surface 121b of the sidewall 121. The side key 210 may be supported by the flange 212 so as not to be separated from the key-hole 124. The side key 210 may include the pressure protrusion 213 that makes contact with the switch 224. The pressure protrusion 213 may protrude from the body 211 toward the switch 224.

In an embodiment, the side key 210 may include a fixing protrusion 214. At least a portion of the fixing protrusion 214 may be disposed in through-holes 226, 238, and 2911 formed in the key circuit board 220, the reinforcing plate 291, and the key bracket 230. The fixing protrusion 214 may extend from the body 211 toward the key bracket 230 by a predetermined length. The fixing protrusion 214 may include two protrusions symmetrical to each other with respect to the pressure protrusion 213. However, this is illustrative, and the number and/or positions of fixing protrusions 214 are not limited to the illustrated embodiment and may be changed according to various embodiments of the disclosure.

In an embodiment, the key bracket 230 may support the key circuit board 220 and the reinforcing plate 291. The key circuit board 220 and the reinforcing plate 291 may be disposed on one surface of the key bracket 230. The key bracket 230, the key circuit board 220, and the reinforcing plate 291 may include the through-holes (e.g., the first through-hole 238, the second through-hole 226, and the third through-hole 2911) in which at least a portion of the fixing protrusion 214 is accommodated. The through-holes 226, 238, and 2911 of the key bracket 230, the key circuit board 220, and the reinforcing plate 291 may be formed to correspond to the number and positions of fixing protrusions 214. For example, in a case in which the fixing protrusion 214 includes two protrusions, two through-holes 226, two through-holes 238, and two through-holes 2911 may be formed in the key circuit board 220, the key bracket 230, and the reinforcing plate 291, respectively.

In an embodiment, the first through-hole 238 may be formed in at least a portion of the key bracket 230. The second through-hole 226 may be formed in at least a portion of the key circuit board 220 to correspond to the first through-hole 238, and the third through-hole 2911 may be formed in at least a portion of the reinforcing plate 291 to correspond to the first through-hole 238 and the second through-hole 226. For example, the first through-hole 238, the second through-hole 226, and the third through-hole 2911 may form an open space into which at least a portion of the fixing protrusion 214 is inserted. According to the illustrated embodiment, the first through-hole 238, the second through-hole 226, and the third through-hole 2911 may be formed in the same size, but are not limited thereto.

In an embodiment, when the side key 210 and the key bracket 230 are coupled to the first support member 120, at least a portion of the fixing protrusion 214 may be inserted into the first through-hole 238, the second through-hole 226, and the third through-hole 2911, and thus a fixing structure may be provided between the key bracket 230 and the side key 210. For example, the side key 210 may be inserted into the key-hole 124 and may be fixed to the first support member 120 accordingly, and the key bracket 230 may be fixed by the fixing protrusion 214 of the side key 210 so as not to be separated from the first support member 120.

Figure 21:
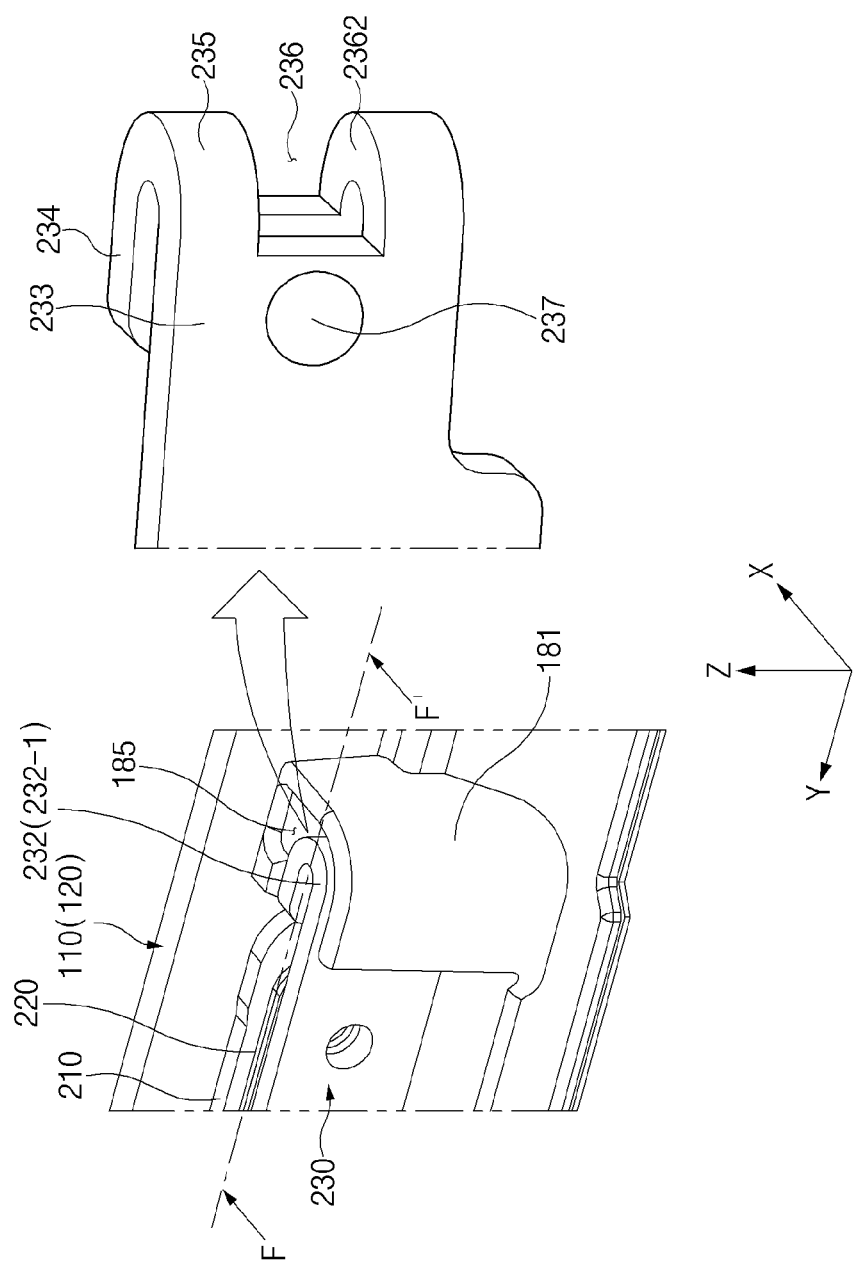
FIG. 21 are perspective views illustrating a state in which a key assembly of the electronic device is coupled to the housing according to an embodiment.
Figure 22:
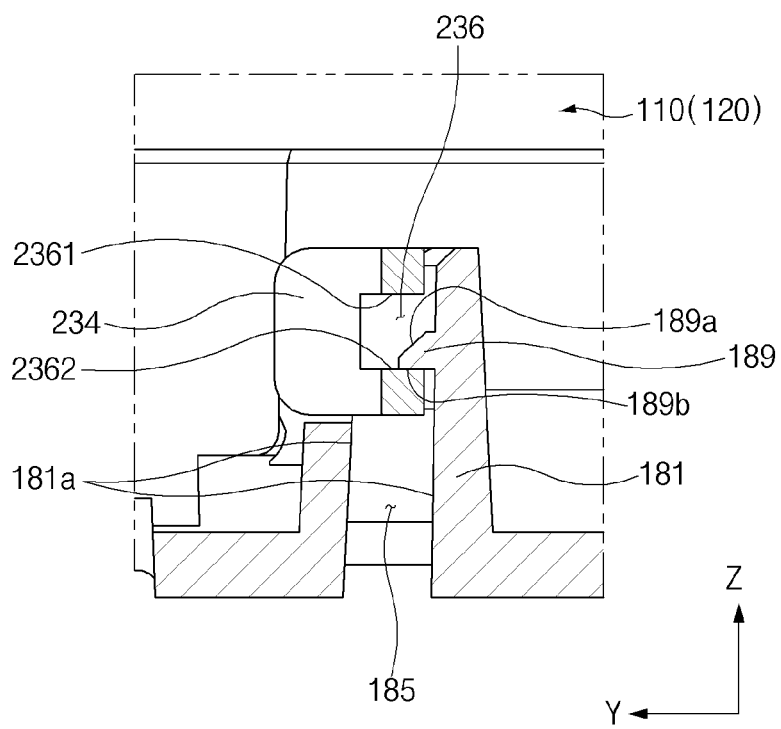
FIG. 22 is a side view illustrating a coupling structure of the housing and a key bracket of the electronic device according to an embodiment.

FIG. 21 is a dual perspective view illustrating a state in which a key assembly of the electronic device is coupled to the housing according to an embodiment. FIG. 22 is a side view illustrating a coupling structure of the housing and a key bracket of the electronic device according to an embodiment.

FIG. 22 illustrates a sectional view taken along line F-F' of FIG. 21.

Referring to FIGS. 21 and 22, the electronic device according to an embodiment (e.g., the electronic device 100 of FIGS. 1 to 6) may include the housing (e.g., the housing 110 of FIGS. 1 to 3), the side key 210, the key circuit board 220, and the key bracket 230. The housing 110 illustrated in FIGS. 21 and 22 may be referred to as the first support member (e.g., the first support member 120 of FIGS. 1 to 9). The components illustrated in FIGS. 21 and 22 are identical or similar to some of the components of the electronic device 100 of FIGS. 1 to 11, and therefore repetitive descriptions will hereinafter be omitted.

In an embodiment, the electronic device 100 may include a fixing structure (or, a locking structure) for fixing the key bracket 230. The fixing structure of the key bracket 230 may include second locking protrusions 189 and locking grooves 236. The second locking protrusions 189 may be disposed on the first support parts 181 of the first support member 120, and the locking grooves 236 may be disposed in the opposite end portions 232 of the key bracket 250.

In an embodiment, the first support member 120 may include the first support parts 181 that support the opposite end portions 232 of the key bracket 230 (e.g., the first end portion 232-1 and the second end portion 232-2 of FIG. 7). The end portions 232 of the key bracket 230 illustrated in FIGS. 21 and 22 may include the first end portion 232-1 and the second end portion 232-2. For example, the coupling structure illustrated in FIGS. 21 and 22 may be identically applied between the second end portion 232-2 and the first support part 181.

In an embodiment, the first support parts 181 may include the receiving recesses 185 in which at least parts of the end portions 232 of the key bracket 230 are accommodated. The at least parts of the end portions 232 of the key bracket 230 may be disposed in the receiving recesses 185, and the contact protrusions 237 formed on the end portions 232 of the key bracket 230 may contact the inner walls of the receiving recesses 185.

In an embodiment, the first support parts 181 may include the second locking protrusions 189. The second locking protrusion 189 may be disposed in the locking grooves 236 formed in the end portions 232 of the key bracket 230. The second locking protrusions 189 may protrude from the inner walls of the receiving recesses 185. Each of the second locking protrusions 189 may include a perpendicular surface 189b substantially facing in the second direction D1 and an inclined surface 189a substantially facing in the first direction D1.

In an embodiment, each of the end portions 232 of the key bracket 230 may include the first portion 233, the second portion 234 extending to face at least part of the first portion 233, and a bending portion 235 formed between the first portion 233 and the second portion 234. Each of the end portions 232 of the key bracket 230 may be formed in a shape in which at least part is bent by the bending portion 235, and the first portion 233 and the second portion 234 may be spaced apart from each other.

In an embodiment, the locking grooves 236 may be formed in the end portions of the key bracket 230. Each of the locking grooves 236 may extend from part of the first portion 233 to part of the second portion 234 via the bending portion 235. For example, the locking groove 236 may be formed by cutting at least parts of the first portion 233, the bending portion 235, and the second portion 234. The second locking protrusion 189 of the first support part 181 may be disposed in the locking groove 236. The bending portion 235 of the key bracket 230 may include stepped surfaces 2361 and 2362 that face each other with the locking groove 236 therebetween as the locking groove 236 is formed. The stepped surfaces 2361 and 2362 may include the first stepped surface 2361 with which the second locking protrusion 189 makes contact and the second stepped surface 2362 facing the first stepped surface 2361.

In an embodiment, when the key bracket 230 moves in the second direction D2 in a process in which the key bracket 230 is coupled to the first support member 120, the end portions 232 of the key bracket 230 may move in the second direction D2 along the inclined surfaces 189a of the second locking protrusions 189. When the key bracket 230 continues to move in the second direction D2, the second locking protrusions 189 may be disposed in the locking grooves 236, and the perpendicular surfaces 189b of the second locking protrusions 189 may contact the first stepped surfaces 2361 formed in the end portions 232 of the key bracket 230. As the second locking protrusions 189 make contact with the first stepped surfaces 2361 in the locking grooves 236, movement or separation of the key bracket 230 from the first support member 120 in the first direction D1 may be limited.

FIG. 23 is a block diagram of an electronic device in a network environment according to various embodiments.

Referring to FIG. 23, the electronic device 2301 in the network environment 2300 may communicate with an electronic device 2302 via a first network 2398 (e.g., a short-range wireless communication network), or at least one of an electronic device 2304 or a server 2308 via a second network 2399 (e.g., a long-range wireless communication network). According to an embodiment, the electronic device 2301 may communicate with the electronic device 2304 via the server 2308.

According to an embodiment, the electronic device 2301 may include a processor 2320, memory 2330, an input module 2350, a sound output module 2355, a display module 2360, an audio module 2370, a sensor module 2376, an interface 2377, a connecting terminal 2378, a haptic module 2379, a camera module 2380, a power management module 2388, a battery 2389, a communication module 2390, a subscriber identification module(SIM) 2396, or an antenna module 2397. In some embodiments, at least one of the components (e.g., the connecting terminal 2378) may be omitted from the electronic device 2301, or one or more other components may be added in the electronic device 2301. In some embodiments, some of the components (e.g., the sensor module 2376, the camera module 2380, or the antenna module 2397) may be implemented as a single component (e.g., the display module 2360).

The processor 2320 may execute, for example, software (e.g., a program 2340) to control at least one other component (e.g., a hardware or software component) of the electronic device 2301 coupled with the processor 2320, and may perform various data processing or computation. According to one embodiment, as at least part of the data processing or computation, the processor 2320 may store a command or data received from another component (e.g., the sensor module 2376 or the communication module 2390) in volatile memory 2332, process the command or the data stored in the volatile memory 2332, and store resulting data in non-volatile memory 2334. According to an embodiment, the processor 2320 may include a main processor 2321 (e.g., a central processing unit (CPU) or an application processor (AP)), or an auxiliary processor 2323 (e.g., a graphics processing unit (GPU), a neural processing unit (NPU), an image signal processor (ISP), a sensor hub processor, or a communication processor (CP)) that is operable independently from, or in conjunction with, the main processor 2321. For example, when the electronic device 2301 includes the main processor 2321 and the auxiliary processor 2323, the auxiliary processor 2323 may be adapted to consume less power than the main processor 2321, or to be specific to a specified function. The auxiliary processor 2323 may be implemented as separate from, or as part of the main processor 2321.

The auxiliary processor 2323 may control at least some of functions or states related to at least one component (e.g., the display module 2360, the sensor module 2376, or the communication module 2390) among the components of the electronic device 2301, instead of the main processor 2321 while the main processor 2321 is in an inactive (e.g., sleep) state, or together with the main processor 2321 while the main processor 2321 is in an active state (e.g., executing an application). According to an embodiment, the auxiliary processor 2323 (e.g., an image signal processor or a communication processor) may be implemented as part of another component (e.g., the camera module 2380 or the communication module 2390) functionally related to the auxiliary processor 2323. According to an embodiment, the auxiliary processor 2323 (e.g., the neural processing unit) may include a hardware structure specified for artificial intelligence model processing. An artificial intelligence model may be generated by machine learning. Such learning may be performed, e.g., by the electronic device 2301 where the artificial intelligence is performed or via a separate server (e.g., the server 2308). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 2330 may store various data used by at least one component (e.g., the processor 2320 or the sensor module 2376) of the electronic device 2301. The various data may include, for example, software (e.g., the program 2340) and input data or output data for a command related thererto. The memory 2330 may include the volatile memory 2332 or the non-volatile memory 2334.

The program 2340 may be stored in the memory 2330 as software, and may include, for example, an operating system (OS) 2342, middleware 2344, or an application 2346.

The input module 2350 may receive a command or data to be used by another component (e.g., the processor 2320) of the electronic device 2301, from the outside (e.g., a user) of the electronic device 2301. The input module 2350 may include, for example, a microphone, a mouse, a keyboard, a key (e.g., a button), or a digital pen (e.g., a stylus pen).

The sound output module 2355 may output sound signals to the outside of the electronic device 2301. The sound output module 2355 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 2360 may visually provide information to the outside (e.g., a user) of the electronic device 2301. The display module 2360 may include, for example, a display, a hologram device, or a projector and control circuitry to control a corresponding one of the display, hologram device, and projector. According to an embodiment, the display module 2360 may include a touch sensor adapted to detect a touch, or a pressure sensor adapted to measure the intensity of force incurred by the touch.

The audio module 2370 may convert a sound into an electrical signal and vice versa. According to an embodiment, the audio module 2370 may obtain the sound via the input module 2350, or output the sound via the sound output module 2355 or a headphone of an external electronic device (e.g., an electronic device 2302) directly (e.g., wiredly) or wirelessly coupled with the electronic device 2301.

The sensor module 2376 may detect an operational state (e.g., power or temperature) of the electronic device 2301 or an environmental state (e.g., a state of a user) external to the electronic device 2301, and then generate an electrical signal or data value corresponding to the detected state. According to an embodiment, the sensor module 2376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2377 may support one or more specified protocols to be used for the electronic device 2301 to be coupled with the external electronic device (e.g., the electronic device 2302) directly (e.g., wiredly) or wirelessly. According to an embodiment, the interface 2377 may include, for example, a high definition multimedia interface (HDMI), a universal serial bus (USB) interface, a secure digital (SD) card interface, or an audio interface.

A connecting terminal 2378 may include a connector via which the electronic device 2301 may be physically connected with the external electronic device (e.g., the electronic device 2302). According to an embodiment, the connecting terminal 2378 may include, for example, a HDMI connector, a USB connector, a SD card connector, or an audio connector (e.g., a headphone connector).

The haptic module 2379 may convert an electrical signal into a mechanical stimulus (e.g., a vibration or a movement) or electrical stimulus which may be recognized by a user via his tactile sensation or kinesthetic sensation. According to an embodiment, the haptic module 2379 may include, for example, a motor, a piezoelectric element, or an electric stimulator.

The camera module 2380 may capture a still image or moving images. According to an embodiment, the camera module 2380 may include one or more lenses, image sensors, image signal processors, or flashes.

The power management module 2388 may manage power supplied to the electronic device 2301. According to one embodiment, the power management module 2388 may be implemented as at least part of, for example, a power management integrated circuit (PMIC).

The battery 2389 may supply power to at least one component of the electronic device 2301. According to an embodiment, the battery 2389 may include, for example, a primary cell which is not rechargeable, a secondary cell which is rechargeable, or a fuel cell.

The communication module 2390 may support establishing a direct (e.g., wired) communication channel or a wireless communication channel between the electronic device 2301 and the external electronic device (e.g., the electronic device 2302, the electronic device 2304, or the server 2308) and performing communication via the established communication channel. The communication module 2390 may include one or more communication processors that are operable independently from the processor 2320 (e.g., the application processor (AP)) and supports a direct (e.g., wired) communication or a wireless communication. According to an embodiment, the communication module 2390 may include a wireless communication module 2392 (e.g., a cellular communication module, a short-range wireless communication module, or a global navigation satellite system (GNSS) communication module) or a wired communication module 2394 (e.g., a local area network (LAN) communication module or a power line communication (PLC) module). A corresponding one of these communication modules may communicate with the external electronic device via the first network 2398 (e.g., a short-range communication network, such as Bluetooth™, wireless-fidelity (Wi-Fi) direct, or infrared data association (IrDA)) or the second network 2399 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 2392 may identify and authenticate the electronic device 2301 in a communication network, such as the first network 2398 or the second network 2399, using subscriber information (e.g., international mobile subscriber identity (IMSI)) stored in the subscriber identification module 2396.

The wireless communication module 2392 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 2392 may support a high-frequency band (e.g., the mmWave band) to achieve, e.g., a high data transmission rate. The wireless communication module 2392 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 2392 may support various requirements specified in the electronic device 2301, an external electronic device (e.g., the electronic device 2304), or a network system (e.g., the second network 2399). According to an embodiment, the wireless communication module 2392 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 2397 may transmit or receive a signal or power to or from the outside (e.g., the external electronic device) of the electronic device 2301. According to an embodiment, the antenna module 2397 may include an antenna including a radiating element composed of a conductive material or a conductive pattern formed in or on a substrate (e.g., a printed circuit board (PCB)). According to an embodiment, the antenna module 2397 may include a plurality of antennas (e.g., array antennas). In such a case, at least one antenna appropriate for a communication scheme used in the communication network, such as the first network 2398 or the second network 2399, may be selected, for example, by the communication module 2390 (e.g., the wireless communication module 2392) from the plurality of antennas. The signal or the power may then be transmitted or received between the communication module 2390 and the external electronic device via the selected at least one antenna. According to an embodiment, another component (e.g., a radio frequency integrated circuit (RFIC)) other than the radiating element may be additionally formed as part of the antenna module 2397.

According to various embodiments, the antenna module 2397 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 2301 and the external electronic device 2304 via the server 2308 coupled with the second network 2399. Each of the electronic devices 2302 or 2304 may be a device of a same type as, or a different type, from the electronic device 2301. According to an embodiment, all or some of operations to be executed at the electronic device 2301 may be executed at one or more of the external electronic devices 2302, 2304, or 2308. For example, if the electronic device 2301 should perform a function or a service automatically, or in response to a request from a user or another device, the electronic device 2301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 2301. The electronic device 2301 may provide the outcome, with or without further processing of the outcome, as at least part of a reply to the request. To that end, a cloud computing, distributed computing, mobile edge computing (MEC), or client-server computing technology may be used, for example. The electronic device 2301 may provide ultra low-latency services using, e.g., distributed computing or mobile edge computing. In another embodiment, the external electronic device 2304 may include an internet-of-things (IoT) device. The server 2308 may be an intelligent server using machine learning and/or a neural network. According to an embodiment, the external electronic device 2304 or the server 2308 may be included in the second network 2399. The electronic device 2301 may be applied to intelligent services (e.g., smart home, smart city, smart car, or healthcare) based on 5G communication technology or IoT-related technology.

An electronic device 100 according to an embodiment of the disclosure may include a housing 110 having a key-hole 124 formed therein, a key 211 coupled to the housing 110 so as to be at least partially disposed in the key-hole 124, a key circuit board 220 that is disposed inside the housing 110 and that includes a switch 224, the switch 224 being disposed on one surface of the key circuit board 220 and pressed by the key 210, a key bracket 230 that supports the key circuit board 220 such that at least a portion of the key circuit board 220 faces the key 210, the key bracket 230 being supported by a support structure 180 formed in the housing 110, and a fixing structure that fixes the key bracket 230 to the housing 110. The fixing structure may include a first locking protrusion 192 or 194 disposed in one of the housing 110 and the key bracket 230 and one of a locking hole 191 or 193 and a locking jaw 195 disposed in the other one of the housing 110 and the key bracket 230 so as to be fastened with the first locking protrusion 192 or 194.

In various embodiments, the support structure 180 may include first support parts 181 that support opposite end portions 232 of the key bracket 230 and at least one second support part 182 that supports a partial area of the key bracket 230 between the opposite end portions 232.

In various embodiments, the second support part 181 may include a first surface 182a that faces the key bracket 230 and a second surface 182b that faces away from the first surface 182a, and the key bracket 230 may be supported by the second support part 182 by contact of at least a portion of the key bracket 230 with the first surface 182a of the second support part 182.

In various embodiments, the first support parts 181 may be paired to face each other and support the opposite end portions 232 of the key bracket 230, and the second support part 182 may be located between the pair of first support parts 181 and may include at least one structure.

In various embodiments, the key bracket 250 or 260 may include a first surface 250a or 260a on which the key circuit board 220 is disposed and a second surface 250b or 260b that faces away from the first surface 250a or 260a and makes contact with one portion of the support structure 180, and the first locking protrusion 194 or the locking jaw 195 may protrude from the second surface 250b or 260b of the key bracket 250 or 260 toward the one portion of the support structure 180.

In various embodiments, the fixing structure may include the first locking protrusion 192 formed on the support structure 180 of the housing 110 and the locking hole 191 that is formed in the key bracket 230 and into which at least a portion of the first locking protrusion 192 is inserted. The first locking protrusion 192 may protrude from a partial area of the first surface 182a of the second support part 182 toward the key bracket 230, and the locking hole 191 may penetrate at least a partial area of the key bracket 230 to correspond to the first locking protrusion 192.

In various embodiments, the fixing structure may include the first locking protrusion 194 formed on the key bracket 250 and the locking hole 193 that is formed in the support structure 180 of the housing 110 and into which at least a portion of the first locking protrusion 194 is inserted. The first locking protrusion 194 may protrude toward the second support part 183 from one surface of the key bracket 250 that faces the second support part 183, and the locking hole 193 may penetrate at least a partial area of the second support part 183 to correspond to the first locking protrusion 194.

In various embodiments, the fixing structure may include the first locking protrusion 192 formed on the support structure 180 of the housing 110 and the locking jaw 195 formed on the key bracket 260 so as to be engaged with the first locking protrusion 192. The first locking protrusion 192 may protrude from a partial area of the first surface 182a of the second support part 182 toward the key bracket 260, and the locking jaw 195 may protrude from at least a partial area of the key bracket 260 toward the second support part 182 to correspond to the first locking protrusion 192.

In various embodiments, the key bracket 240 may include a first bracket 241 having the key circuit board 220 disposed on one surface thereof and a second bracket 242 disposed on an opposite surface of the first bracket 241. The first locking protrusion 192 may protrude from a partial area of the first surface 182a of the second support part 182 toward the second bracket 242, and the locking hole 191 may penetrate at least a partial area of the second bracket 242 to correspond to the first locking protrusion 192.

In various embodiments, the support structure 180 may include first support parts 181 that support opposite end portions 232 of the key bracket 230. The first support parts 181 may include receiving recesses 185 in which at least parts of the opposite end portions 232 of the key bracket 230 are accommodated. The opposite end portions 232 of the key bracket 230 may be inserted into the receiving recesses 185.

In various embodiments, the first support parts 181 may further include second locking protrusions 189 that protrude from inner walls of the receiving recesses 185, and the key bracket 230 may include locking grooves 236 that are formed in the opposite end portions 232 of the key bracket 230 and to which the second locking protrusions 189 are fastened.

In various embodiments, the key bracket 230 may include a base part 231 on which the key circuit board 220 is disposed and a first end portion 232-1 and a second end portion 232-2 that extend from the base part 231, and each of the first end portion 232-1 and the second end portion 232-2 may be formed in a shape in which at least a portion is bent.

In various embodiments, the support structure 180 may include receiving recesses 185 in which at least part of the first end portion 232-1 and at least part of the second end portion 232-2 are accommodated, and contact protrusions 237 that make contact with inner walls of the receiving recesses 185 may be formed on the first end portion 232-1 and the second end portion 232-2.

In various embodiments, the key 210 may include a side key disposed on a side surface of the housing 110. The housing 110 may include a sidewall 121 that forms at least a portion of the side surface of the housing 110 and has the key-hole 124 formed therein and a plate 122 that extends from the sidewall 121 toward the inside of the housing 110. The key bracket 270 may further include a first extension 271 that extends from the base part 231 toward the plate 122. The plate 122 may include an opening 126 in which at least a portion of the first extension 271 is disposed and a step 125 that extends from an inner wall of the opening 126, the first extension 271 being stopped by the step 125.

In various embodiments, the support structure 180 may include at least one second support part 184 that faces the base part of the key bracket 280. The key bracket 280 may further include a second extension 281 and a third extension 282 that extend from partial areas of the base part toward the second support part 184. The second support part 184 may be disposed between the second extension 281 and the third extension 282. The second support part 184 may have, on one side thereof, a first recess 184d into which a portion of the second extension 281 is inserted and may have, on an opposite side thereof, a second recess 184e into which a portion of the third extension 282 is inserted.

In various embodiments, the key 210 may include at least one fixing protrusion 214 that protrudes toward the key circuit board 220 or the key bracket 230. The key bracket 230 may have, in a partial area thereof, at least one first through-hole 238 into which at least a portion of the fixing protrusion 214 is inserted. The key circuit board 220 may have, in a partial area thereof, at least one second through-hole 226 into which at least a portion of the fixing protrusion 214 is inserted and that is connected with the first through-hole 238.

An electronic device 100 according to an embodiment of the disclosure may include a housing 110 including a front surface, a rear surface that faces away from the front surface, and a side surface that surrounds an inner space between the front surface and the rear surface, a key-hole 124 being formed in a partial area of the side surface, a printed circuit board disposed in the inner space, a side key 210 that is at least partially inserted into the key-hole 124 and that moves in the key-hole 124 by a click operation, a key circuit board 220 that is disposed in the inner space and that includes a switch 224 pressed by the side key 210, a connecting terminal 225 electrically connected with the printed circuit board being disposed on at least a portion of the key circuit board 220, a key bracket 230 on which at least a portion of the key circuit board 220 is seated and that supports the key circuit board 220 such that the key circuit board 220 is fixed in the inner space, and a fixing structure that fixes the key bracket 230 to the housing 110. The fixing structure may include a first locking protrusion 192 or 194 disposed in one of the housing 110 and the key bracket 230 and one of a locking hole 191 or 193 and a locking jaw 195 disposed in the other one of the housing 110 and the key bracket 230 so as to be fastened with the first locking protrusion 192 or 194.

In various embodiments, the housing 110 may include a first support member 120 on which a support structure 180 that supports the key bracket 230 is disposed. The first support member 120 may include a sidewall 121 that forms at least a portion of the side surface of the housing 110 and has the key-hole 124 formed therein and a plate 122 that extends from the sidewall 121 toward the inner space. The support structure 180 may include first support parts 181 that support opposite end portions 232 of the key bracket 230 and at least one second support part 182 that supports a partial area of the key bracket 230 between the opposite end portions 232.

In various embodiments, the fixing structure may include the first locking protrusion 192 and a locking hole 192 into which at least a portion of the first locking protrusion 192 is inserted. The first locking protrusion 192 may protrude from a partial area of the second support part 182 toward the key bracket 230, and the locking hole 191 may penetrate at least a partial area of the key bracket 230 to correspond to the first locking protrusion 192. Insertion of the first locking protrusion 192 into the locking hole 191 may limit movement of the key bracket 230 in a direction substantially parallel to the sidewall 121 or may prevent separation of the key bracket 230 from the support structure 180.

In various embodiments, the fixing structure may include the first locking protrusion 192 and a locking jaw 195 engaged with at least a portion of the first locking protrusion 192. The first locking protrusion 192 may protrude from a partial area of the second support part 182 toward the key bracket 260, and the locking jaw 195 may protrude from a partial area of the key bracket 260 toward the second support part 182 to correspond to the first locking protrusion 192. Engagement of the first locking protrusion 192 with the locking jaw 195 in an up/down direction may limit movement of the key bracket 260 in a direction substantially parallel to the sidewall 121 or may prevent separation of the key bracket 260 from the support structure 180.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 2340) including one or more instructions that are stored in a storage medium (e.g., internal memory 2336 or external memory 2338) that is readable by a machine (e.g., the electronic device 100, 2301). For example, a processor (e.g., the processor 2320) of the machine (e.g., the electronic device 100, 2301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a housing having a key-hole formed therein;
a key coupled to the housing to be at least partially disposed in the key-hole;
a key circuit board disposed inside the housing, the key circuit board comprising a switch disposed on one surface of the key circuit board and configured to be pressed by the key;
a key bracket configured to support the key circuit board such that at least a portion of the key circuit board faces the key;
a support structure formed in the housing to support the key bracket; and
a fixing structure configured to fix the key bracket to the housing,
wherein the fixing structure comprises:
a first locking protrusion disposed in one of the housing and the key bracket; and
one of a locking hole and a locking jaw disposed in the other one of the housing and the key bracket to be fastened with the first locking protrusion.

2. The electronic device of claim 1, wherein the support structure comprises:

first support parts configured to support opposite end portions of the key bracket; and
at least one second support part configured to support a partial area of the key bracket between the opposite end portions.

3. The electronic device of claim 2, wherein the at least one second support part comprises:
a first surface configured to face the key bracket; and
a second surface configured to face away from the first surface,
wherein the key bracket is configured to be supported by the at least one second support part by contact of at least a portion of the key bracket with the first surface of the at least one second support part.

4. The electronic device of claim 2, wherein:
the first support parts are paired to face each other and to support the opposite end portions of the key bracket, and
the at least one second support part is located between the first support parts.

5. The electronic device of claim 1, wherein:
the key bracket comprises a first surface on which the key circuit board is disposed and a second surface configured to face away from the first surface and to make contact with one portion of the support structure, and
one of the first locking protrusion and the locking jaw protrudes from the second surface of the key bracket toward the one portion of the support structure.

6. The electronic device of claim 3, wherein:
the fixing structure comprises the first locking protrusion formed on the support structure of the housing and the locking hole that is formed in the key bracket and into which at least a portion of the first locking protrusion is inserted,
the first locking protrusion protrudes from a partial area of the first surface of the at least one second support part toward the key bracket, and
the locking hole penetrates at least a partial area of the key bracket to correspond to the first locking protrusion.

7. The electronic device of claim 3, wherein:
the fixing structure comprises the first locking protrusion formed on the key bracket and the locking hole that is formed in the support structure of the housing and into which at least a portion of the first locking protrusion is inserted,
the first locking protrusion protrudes toward the second support part from one surface of the key bracket configured to face the at least one second support part, and
the locking hole penetrates at least a partial area of the at least one second support part to correspond to the first locking protrusion.

8. The electronic device of claim 3, wherein:
the fixing structure comprises the first locking protrusion formed on the support structure of the housing and the locking jaw formed on the key bracket so as to be engaged with the first locking protrusion,
the first locking protrusion protrudes from a partial area of the first surface of the at least one second support part toward the key bracket, and
the locking jaw protrudes from at least a partial area of the key bracket toward the at least one second support part to correspond to the first locking protrusion.

9. The electronic device of claim 3, wherein:
the key bracket comprises a first bracket having the key circuit board disposed on one surface thereof and a second bracket disposed on an opposite surface of the first bracket,
the first locking protrusion protrudes from a partial area of the first surface of the at least one second support part toward the second bracket, and
the locking hole penetrates at least a partial area of the second bracket to correspond to the first locking protrusion.

10. The electronic device of claim 1, wherein:
the support structure comprises first support parts configured to support opposite end portions of the key bracket,
the first support parts comprise receiving recesses in which at least parts of the opposite end portions of the key bracket are accommodated, and
the opposite end portions of the key bracket are configured to be inserted into the receiving recesses.

11. The electronic device of claim 1, wherein:
the key bracket comprises a base part on which the key circuit board is disposed and a first end portion and a second end portion configured to extend from the base part, and
each of the first end portion and the second end portion is formed in a shape in which at least a portion is bent.

12. The electronic device of claim 11, wherein:
the support structure comprises receiving recesses in which at least part of the first end portion and at least part of the second end portion are accommodated, and
contact protrusions configured to make contact with inner walls of the receiving recesses are formed on the first end portion and the second end portion.

13. The electronic device of claim 11, wherein:
the key comprises a side key disposed on a side surface of the housing,
the housing comprises a sidewall configured to form at least a portion of the side surface of the housing, the sidewall having the key-hole formed therein, and a plate configured to extend from the sidewall toward the inside of the housing,
the key bracket further comprises a first extension configured to extend from the base part toward the plate, and
the plate comprises an opening in which at least a portion of the first extension is disposed and a step configured to extend from an inner wall of the opening, the first extension being stopped by the step.

14. The electronic device of claim 11, wherein:
the support structure comprises at least one second support part configured to face the base part of the key bracket,
the key bracket further comprises a second extension and a third extension configured to extend from partial areas of the base part toward the at least one second support part,
the at least one second support part is disposed between the second extension and the third extension, and
the at least one second support part has, on one side thereof, a first recess into which a portion of the second extension is inserted and has, on an opposite side thereof, a second recess into which a portion of the third extension is inserted.

15. The electronic device of claim 1, wherein:
the key comprises at least one fixing protrusion configured to protrude toward the key circuit board or the key bracket,
the key bracket has, in a partial area thereof, at least one first through-hole into which at least a portion of the fixing protrusion is inserted, and
the key circuit board has, in a partial area thereof, at least one second through-hole into which at least a portion of the fixing protrusion is inserted and that is connected with the first through-hole.

16. An electronic device comprising:
a housing comprising a front surface, a rear surface configured to face away from the front surface, and a side surface configured to surround an inner space between the front surface and the rear surface, a key-hole being formed in a partial area of the side surface;
a printed circuit board disposed in the inner space;
a side key at least partially inserted into the key-hole and configured to move in the key-hole by a click operation;
a key circuit board disposed in the inner space, the key circuit board comprising a switch pressed by the side key, wherein a connecting terminal electrically connected with the printed circuit board is disposed on at least a portion of the key circuit board;
a key bracket on which at least a portion of the key circuit board is seated, the key bracket being configured to support the key circuit board such that the key circuit board is fixed in the inner space; and
a fixing structure configured to fix the key bracket to the housing,
wherein the fixing structure comprises:
a first locking protrusion disposed in one of the housing and the key bracket; and
one of locking hole and a locking jaw disposed in the other one of the housing and the key bracket so as to be fastened with the first locking protrusion.

17. The electronic device of claim 16, wherein:
the housing comprises a first support member on which a support structure configured to support the key bracket is disposed,
the first support member comprises a sidewall configured to form at least a portion of the side surface of the housing, the sidewall having the key-hole formed therein, and a plate configured to extend from the sidewall toward the inner space, and
the support structure comprises first support parts configured to support opposite end portions of the key bracket and at least one second support part configured to support a partial area of the key bracket between the opposite end portions.

18. The electronic device of claim 17, wherein:
the fixing structure comprises the first locking protrusion and a locking hole into which at least a portion of the first locking protrusion is inserted,
the first locking protrusion protrudes from a partial area of the second support part toward the key bracket and the locking hole penetrates at least a partial area of the key bracket to correspond to the first locking protrusion, and
insertion of the first locking protrusion into the locking hole limits movement of the key bracket in a direction substantially parallel to the sidewall or prevents separation of the key bracket from the support structure.

19. The electronic device of claim 17, wherein:
the fixing structure comprises the first locking protrusion and a locking jaw engaged with at least a portion of the first locking protrusion,
the first locking protrusion protrudes from a partial area of the at least one second support part toward the key bracket, and the locking jaw protrudes from a partial area of the key bracket toward the at least one second support part to correspond to the first locking protrusion, and
engagement of the first locking protrusion with the locking jaw in an up/down direction limits movement of the key bracket in a direction substantially parallel to the sidewall or prevents separation of the key bracket from the support structure.

20. An electronic device comprising:
a key coupled to a housing for partial disposition in a key-hole defined in the housing;
a key circuit board disposed inside the housing and comprising a switch on one surface thereof that is pressable by the key;
a key bracket supportive of the key circuit board such that a portion of the key circuit board faces the key;
a support structure formed in the housing and supportive of the key bracket; and
a fixing structure by which the key bracket is fixed to the housing, the fixing structure comprising:
a first locking protrusion disposed in one of the housing and the key bracket; and
one of a locking hole and a locking jaw disposed in the other one of the housing and the key bracket to be fastened with the first locking protrusion.

\* \* \* \* \*